US012749119B2

(12) United States Patent
Bak

(10) Patent No.: US 12,749,119 B2
(45) Date of Patent: Sep. 29, 2026

(54) METHOD OF PROVIDING INFORMATION AND AN ELECTRONIC DEVICE PERFORMING THEREOF

(71) Applicant: DUNAMU INC., Seoul (KR)

(72) Inventor: Seyeon Bak, Seoul (KR)

(73) Assignee: DUNAMU INC., Seoul (KR)

( * ) Notice: Subject to any disclaimer, the term of this patent is extended or adjusted under 35 U.S.C. 154(b) by 0 days.

(21) Appl. No.: 19/012,658

(22) Filed: Jan. 7, 2025

(65) Prior Publication Data

US 2025/0225580 A1 Jul. 10, 2025

(30) Foreign Application Priority Data

Jan. 10, 2024 (KR) ........................ 10-2024-0004421

(51) Int. Cl.
*G06Q 40/04* (2012.01)

(52) U.S. Cl.
CPC ........... *G06Q 40/043* (2025.08); *G06Q 40/04* (2013.01); *G06Q 40/0431* (2025.08)

(58) Field of Classification Search
CPC ... G06Q 40/04; G06Q 40/043; G06Q 40/0431
See application file for complete search history.

(56) References Cited

U.S. PATENT DOCUMENTS 11,315,186 B1 * 4/2022 Kizhakhemadtil .... G06Q 40/04
2006/0036531 A1 * 2/2006 Jackson ............... G06Q 20/042 705/37
2010/0005022 A1 * 1/2010 DePetris ................ G06Q 40/04 705/37
2013/0030976 A1 * 1/2013 Helweg .................. G06Q 40/04 705/37
2020/0311615 A1 * 10/2020 Jammalamadaka ... G06N 20/20
2020/0364791 A1 * 11/2020 Taylor ..................... G06Q 40/04
2022/0327556 A1 * 10/2022 Smyth ................ G06Q 30/0201
2024/0078644 A1 * 3/2024 Veloso ....................... G06T 5/77
2024/0233027 A1 * 7/2024 Patel ....................... G06Q 40/06

FOREIGN PATENT DOCUMENTS

JP 2002269357 A 9/2002
KR 10-2001-0095506 A 11/2001
KR 10-2002-0007522 A 1/2002
KR 10-2013-0138886 A 12/2013
KR 10-2022-0017598 A 2/2022
KR 10-2022-0039237 A 3/2022
KR 10-2023-0082075 A 6/2023

* cited by examiner

*Primary Examiner* — Scott C Anderson
(74) *Attorney, Agent, or Firm* — Seed Intellectual Property Law Group LLP

(57) ABSTRACT

Provided is a method of providing information by an electronic device, the method including identifying a set input of a user for a first stock at a first time point, based on a first trading condition set corresponding to the user and the set input, identifying a first data set corresponding to the first stock at the first time point, based on the first trading condition set and the first data set, obtaining a first trading condition match rate at the first time point, and providing information on a final trading condition match rate determined based on the first trading condition match rate to the user.

20 Claims, 25 Drawing Sheets

FIG. 6A
600
First stock
476,500
1,000 ▲ 0.21%
First Securities
Data shortage
Quote
Chart
Execution
Daily
Broker
Investor
Chart prediction
10 times
Tick
Minute
Day
Week
Month
Year
Simple MA 5 10 20 60 120
620,000
580,000
540,000
500,000
476,500
461,500
-03
2023-08-01
2023-09-01
Volume simple MA 5 10 20
1,477,277
984,851
492,426
256,074
Market price
News/Disclosure
Discussion
Profit/Notes
Stock information

FIG. 7A
700
First stock
476,500
1,000 ▲ 0.21%
First Securities
Data shortage
Quote
Chart
Execution
Daily
Broker
Investor
Chart prediction
10 times
Tick
Minute
Day
Week
Month
Year
720
Simple MA 5 10 20 60 120
620,000
580,000
540,000
500,000
476,500
461,500
-03
2023-08-01
2023-09-01
Volume simple MA 5 10 20
1,477,277
984,851
492,426
256,074
Market price
News/Disclosure
Discussion
Profit/Notes
Stock information

METHOD OF PROVIDING INFORMATION AND AN ELECTRONIC DEVICE PERFORMING THEREOF

CROSS-REFERENCE TO RELATED APPLICATION(S)

This application claims the benefit of Korean Patent Application No. 10-2024-0004421, filed on Jan. 10, 2024, in the Korean Intellectual Property Office, the disclosure of which is incorporated herein by reference.

BACKGROUND

Technical Field

Example embodiments relate to an electronic device for providing information useful for a user to buy or sell assets in a timely manner and a control method thereof.

Description of the Related Art

The widespread use of the Internet is leading to a growing market of trading assets such as stocks or coins. In particular, after the spread of an infectious disease, a sense of crisis about being unable to grow wealth by deposits or installment savings is spread and interest in personal finance is increasing rapidly.

BRIEF SUMMARY

However, the inventors of the present disclosure have appreciated that many users have a tendency of buying or selling without fixed trading rules or criteria by temporary emotions or atmospheres, which causes a heavy loss. In addition, even though a user is searching for a specific stock through quantified screening conditions about a technical indicator set by the user or financial statements, many conditions are to be found and set one by one, which is difficult for those unfamiliar with a computer or a mobile application. Various embodiments of the present disclosure focus on and provide technical solutions to the problems associated with trading in the related art, including the aforementioned technical problem. An aspect of example embodiments provides an electronic device and a method of managing information thereof. More specifically, another aspect of example embodiments provides an electronic device for providing information useful for a user to buy or sell assets in a timely manner and a control method thereof.

Example embodiments are not limited to the technical features described above, and other technical features may be inferred from the example embodiments below.

According to an aspect, there is provided a method of providing information by an electronic device, the method including identifying a set input of a user for a first stock at a first time point, based on a first trading condition set corresponding to the user and the set input, identifying a first data set corresponding to the first stock at the first time point, based on the first trading condition set and the first data set, obtaining a first trading condition match rate at the first time point, and providing information on a final trading condition match rate determined based on the first trading condition match rate to the user. In this case, the first time point may be understood as a time point corresponding to the selected location.

In addition, according to an example embodiment, the obtaining of the first trading condition match rate at the first time point may include, based on data corresponding to each trading condition included in the first trading condition set among the first data set, obtaining one or more sub-condition match rates corresponding to the each trading condition, and based on the one or more sub-condition match rates, obtaining the first trading condition match rate.

In addition, according to an example embodiment, a first trading condition among the first trading condition set may include a condition regarding whether a moving average line is arranged in a set arrangement order, and the first data set may include data about an arrangement order of one or more moving average lines regarding the first stock at the first time point, and a first sub-condition match rate corresponding to the first trading condition among the one or more sub-condition match rates may be determined based on a number of arrangement matches between the arrangement order of the one or more moving average lines and the set arrangement order.

In addition, according to an example embodiment, a second trading condition among the first trading condition set may include a condition regarding whether a desired trading price is located above or below a moving average line, and the first data set may include data about a first price corresponding to the set input and data about one or more moving average lines regarding the first stock at the first time point, and a second sub-condition match rate corresponding to the second trading condition among the one or more sub-condition match rates may be determined based on a number of moving average lines lower than the first price among the one or more moving average lines.

In addition, according to an example embodiment, a third trading condition among the first trading condition set may include a condition regarding a disparity rate of a moving average line, and the first data set may include data about one or more moving average values regarding the first stock at the first time point, and a third sub-condition match rate corresponding to the third trading condition among the one or more sub-condition match rates may be determined based on an average value of a variation ratio between an average value of the one or more moving average values and each of the one or more moving average values.

In addition, according to an example embodiment, a fourth trading condition among the first trading condition set may include a condition regarding whether a candle is a positive candle or a negative candle, and the first data set may include data about a first candle of the first stock at the first time point, and a fourth sub-condition match rate corresponding to the fourth trading condition among the one or more sub-condition match rates may have a set first value when the first candle is a candle of a type set as the fourth trading condition between the positive candle and the negative candle and may have a set second value when the first candle is not the candle of the type set as the fourth trading condition.

In addition, according to an example embodiment, a fifth trading condition among the first trading condition set may include a condition regarding a ratio of a current trading volume to an immediately previous trading volume, and the first data set may include data about a first trading volume of the first stock at the first time point and data about a second trading volume of the first stock at a time point earlier than the first time point by a set time unit, and a fifth sub-condition match rate corresponding to the fifth trading condition among the one or more sub-condition match rates may be determined based on a ratio between the first trading volume and the second trading volume.

In addition, according to an example embodiment, a sixth trading condition among the first trading condition set may include a condition regarding a reference value corresponding to a first technical indicator, and the first data set may include data about a third value corresponding to the first technical indicator of the first stock at the first time point, and a sixth sub-condition match rate corresponding to the sixth trading condition among the one or more sub-condition match rates may be determined based on a value obtained by dividing a difference between the third value and the reference value by the reference value, and the first technical indicator may include at least one of a relative strength index (RSI) or a stochastic index.

In addition, according to an example embodiment, based on the one or more sub-condition match rates, the obtaining of the first trading condition match rate may include applying a weight to each of the one or more sub-condition match rates, and the weight may be determined based on at least one of a rate of return in trading based on a trading condition corresponding to each of the one or more sub-condition match rates or a number of times that the trading condition corresponding to each of the one or more sub-condition match rates is included in a trading condition set by the user.

In addition, according to an example embodiment, the method may further include providing information about a first chart of a second stock to the user, identifying a location selected by the user on the first chart, and storing the first trading condition set generated based on a trading data set corresponding to the selected location.

In addition, according to an example embodiment, the providing of the information about the first chart of the second stock to the user may include identifying settings information inputted by the user regarding a chart indicator, and based on the settings information, providing information about a changed first chart of the second stock to the user.

In addition, according to an example embodiment, the storing of the first trading condition set may include, based on the trading data set, providing a list of a plurality of trading conditions to the user, identifying one or more trading conditions selected by the user among the plurality of trading conditions, and generating the first trading condition set including the one or more trading conditions.

In addition, according to an example embodiment, the method may further include, for a set third stock, obtaining a second trading condition match rate at a second time point, and when the second trading condition match rate is greater than or equal to a first threshold value, providing a notification to the user.

In addition, according to an example embodiment, the method may further include, for a set fourth stock, obtaining a third trading condition match rate at a third time point, and when the third trading condition match rate is greater than or equal to a second threshold value, transmitting a trading request for the fourth stock to a first server.

In addition, according to an example embodiment, the method may further include, for a plurality of set stocks, obtaining a plurality of trading condition match rates at a fourth time point, identifying one or more trading condition match rates greater than or equal to a third threshold value among the plurality of trading condition match rates, and providing information on one or more stocks corresponding to the one or more trading condition match rates to the user.

In addition, according to an example embodiment, the method may further include, based on a second trading condition set, identifying a second data set corresponding to the set input, and based on the second trading condition set and the second data set, obtaining a fourth trading condition match rate at the first time point, and the final trading condition match rate may be determined further based on the fourth trading condition match rate.

In addition, according to an example embodiment, the final trading condition match rate may be determined as an average value of the first trading condition match rate and the fourth trading condition match rate or a highest value of the first trading condition match rate and the fourth trading condition match rate.

According to another aspect, there is provided an electronic device including one or more processors and a memory configured to store one or more instructions executed by the one or more processors, and the one or more processors may be configured, by executing the one or more instructions, to identify a set input of a user for a first stock at a first time point, based on a first trading condition set corresponding to the user and the set input, identify a first data set corresponding to the first stock at the first time point, based on the first trading condition set and the first data set, obtain a first trading condition match rate at the first time point, and provide information on a final trading condition match rate determined based on the first trading condition match rate to the user.

According to yet another aspect, there is provided a non-transitory computer-readable recording medium having a program for implementing a method performed by an electronic device.

Additional aspects of example embodiments will be set forth in part in the description which follows and, in part, will be apparent from the description.

According to example embodiments, when a user buys or sells a specific stock at a specific time point, it is possible for an electronic device to determine whether the corresponding time point is suitable for trading by comparing a data set at the corresponding time point and a data set corresponding to a previously stored trading condition set and provide information thereabout. Accordingly, it is possible for the user to determine the suitability of trading without following temporary emotions or atmospheres by objectively evaluating whether the corresponding time point is suitable to buy or sell the corresponding stock.

In addition, according to example embodiments, it is possible for an electronic device to, when a trading condition match rate for a stock set by a user is greater than or equal to a set value, provide information indicating that the trading condition match rate for the corresponding stock is greater than or equal to a threshold value to the user, and thus, for the user to buy or sell the corresponding stock in a timely manner.

In addition, according to example embodiments, it is possible for an electronic device to, when a trading condition match rate for a stock set by a user is greater than or equal to a set value, automatically buy or sell the corresponding stock, and thus, for the user to buy or sell the corresponding stock in a timely manner.

In addition, according to example embodiments, it is possible for an electronic device to provide information on at least one stock for which a trading condition match rate is greater than or equal to a set value among one or more stocks set by a user to the user, and thus, for the user to identify a stock that meets a desired condition thereof more conveniently.

In addition, according to example embodiments, it is possible for an electronic device to provide information on a trading condition match rate after trading by a user, and thus, for the user to identify objective information about a trading pattern thereof.

The technical benefits achieved by example embodiments are not limited to those described above, and other technical benefits may be clearly understood by those skilled in the art from the appended claims.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE SEVERAL VIEWS OF THE DRAWINGS

These and/or other aspects, features, and advantages of the disclosure will become apparent and more readily appreciated from the following description of example embodiments, taken in conjunction with the accompanying drawings of which.

DETAILED DESCRIPTION

Figure 1:
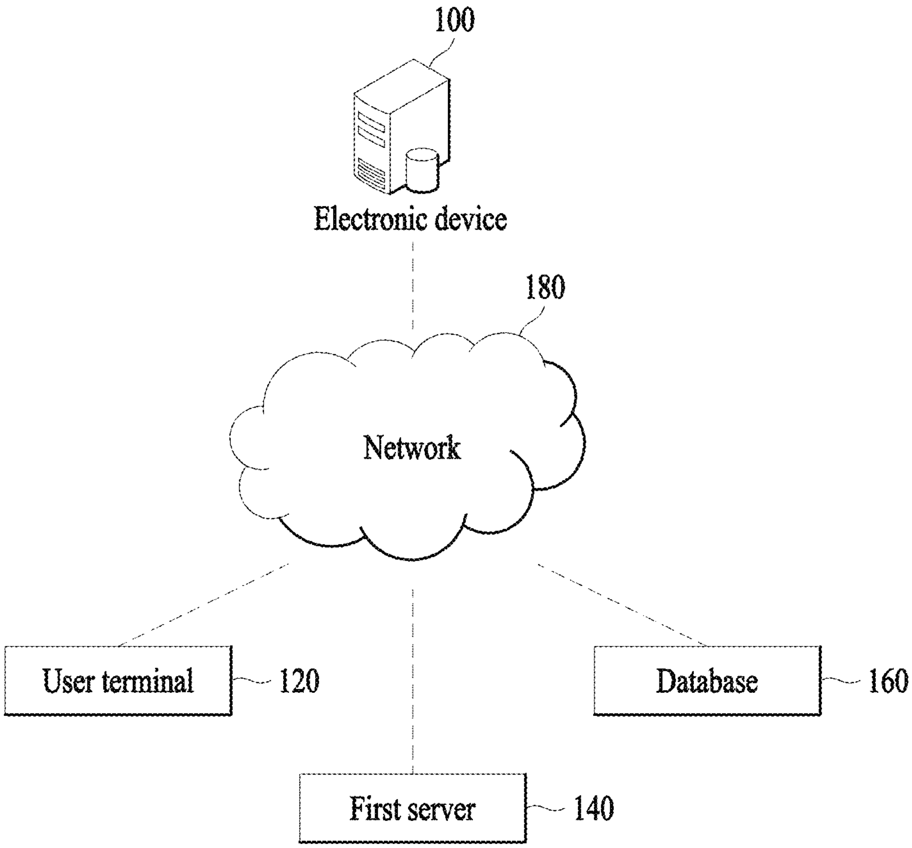
FIG. 1 shows a system according to an example embodiment.

Terms used in example embodiments are selected from currently widely used general terms when possible while considering the functions in the present disclosure. However, the terms may vary depending on the intention of a person skilled in the art, precedents, the emergence of new technology, and the like. Further, in certain cases, there are also terms arbitrarily selected by the applicant, and in these cases, the meaning will be described in detail in the corresponding descriptions. Therefore, the terms used in the present disclosure are not to be construed simply as its designation but based on the meaning of the term and the overall context of the present disclosure.

Throughout the specification, when a part is described as "comprising or including" a component, it does not exclude another component but may further include another component unless otherwise stated.

The expression "at least one of a, b, or c" described throughout the specification may include "a alone," "b alone," "c alone," "a and b," "a and c," "b and c," or "all of a, b, and c."

In the present disclosure, a "terminal" may be implemented as, for example, a computer or a portable terminal capable of accessing a server or another terminal through a network. Here, the computer may include, for example, a notebook, a desktop computer, and/or a laptop computer which are equipped with a web browser. The portable terminal may be a wireless communication apparatus ensuring portability and mobility and include (but is not limited to) any type of handheld wireless communication apparatus, for example, a tablet PC, a smartphone, a communication-based terminal such as international mobile telecommunication (IMT), code division multiple access (CDMA), w-code division multiple access (W-CDMA), long term evolution (LTE), or the like.

While terms including ordinal numbers such as "first," "second," or the like may be used herein to describe various elements, such elements are not limited to the above terms. For example, a first element and a second element may refer to each different object or refer to an identical object.

Hereinafter, example embodiments of the present disclosure will be described in detail with reference to the accompanying drawings so that those of ordinary skill in the art to which the present disclosure pertains may easily implement example embodiments of the present disclosure. However, the present disclosure may be implemented in multiple different forms and is not limited to the example embodiments described herein.

In the present disclosure, a trading condition may refer to a set condition for buying or selling various types of assets such as stocks or virtual assets, and one or more indicators among various types of indicators such as a trading price, a moving average line, a candle, a trading volume, a relative strength index (RSI), or a stochastic index may be set as a condition for buying or selling. However, the trading condition may be referred to as a trading time point, a trading timing, or a trading criterion, and terms referring thereto are not limited to the above descriptions.

In the present disclosure, a trading condition match rate may refer to a value indicating a degree of matching between data at a specific time point and data set as a criterion of a trading condition and may be obtained in various manners depending on an indicator that forms the trading condition and represented as a percentage or a decimal number. However, the trading condition match rate may be referred to as a trading time point match rate, a trading timing match rate, or a trading criterion match rate, and terms referring thereto are not limited to the above descriptions.

Hereinafter, example embodiments of the present disclosure will be described in detail with reference to the accompanying drawings.

FIG. 1 shows a system according to an example embodiment.

Referring to FIG. 1, the system may include at least one of an electronic device 100, a user terminal 120, a first server 140, a database 160, and a network 180. In various example embodiments, some of the elements illustrated in FIG. 1 may be implemented as a single integrated element, and some of the elements illustrated in FIG. 1 may also be implemented as a plurality of separate elements. It may be understood by those of ordinary skill in the art to which the example embodiments pertain that other general-purpose elements in addition to the elements illustrated in FIG. 1 may be further included.

The electronic device 100 may be a device that configures and provides a variety of information. The electronic device 100 may provide the configured information to a web page or an application screen or in a form that may be displayed on a web page or an application screen in a terminal provided with information.

According to an example embodiment, the electronic device 100 may provide information on a trading condition match rate of various types of assets based on a trading condition set that is set directly by a user. For example, the electronic device 100 may identify a set input of a user for a first stock at a first time point, and based on a first trading condition set among one or more sets of trading conditions corresponding to the user and the set input, identify a first data set corresponding to the first stock at the first time point. Subsequently, the electronic device 100 may, based on the first trading condition set and the first data set, obtain a first trading condition match rate at the first time point, and provide information on a final trading condition match rate determined based on the first trading condition match rate to the user.

The user terminal 120 may be a terminal used by each user, and users may access a service provided by the electronic device 100 using the individual user terminal 120 through the network 180. For example, the users may set and store a trading condition set using an application installed in the individual user terminal 120. Alternatively, the users may identify a trading condition match rate for one or more stocks using an application installed in the individual user terminal 120 and buy or sell one or more stocks.

The first server 140 may provide information on various types of assets and perform a trade execution function. For example, the first server 140 may provide information on companies listed on a stock market (for example, the Korean Composite Stock Price Index (KOSPI) or the Korean Securities Dealers Automated Quotations (KOSDAQ)), information on companies traded in an unlisted stock market (for example, Korea New Exchange (KONEX) or Korea Over-The-Counter (K-OTC)), or information on coins traded in a centralized exchange (CEX) or a decentralized exchange (DEX). Alternatively, the first server 140 may perform the function of trade execution for stocks or virtual assets based on a trading request received from the electronic device 100.

The database 160 may be a data structure implemented in a predetermined storage space, and functions such as storing, searching, deleting, editing, or adding of data may be performed freely therein. For example, the database 160 may include fields or components for processing the functions such as storing, searching, deleting, editing, or adding of data. In addition, the database 160 may store a plurality of sets of trading conditions corresponding to each user.

Meanwhile, FIG. 1 illustrates that the first server 140 and the database 160 are present outside the electronic device 100, but this is merely an example embodiment, and the first server 140 and the database 160 may be included in the electronic device 100.

The user terminal 120, the first server 140, and the database 160 and the electronic device 100 may communicate with each other within the network 180. The network 180 may include a local area network (LAN), a wide area network (WAN), a value added network (VAN), a mobile radio communication network, a satellite communication network, and a combination thereof and may be a comprehensive data communication network that allows each network constituent illustrated in FIG. 1 to communicate smoothly with each other and may include wired Internet, wireless Internet, and a mobile wireless communication network. Wireless communication may include, for example, wireless LAN (Wi-Fi), Bluetooth, Bluetooth low energy, ZigBee, Wi-Fi Direct (WFD), ultra wideband (UWB), infrared data association (IrDA), and near field communication (NFC) but is not limited thereto.

Figure 2:
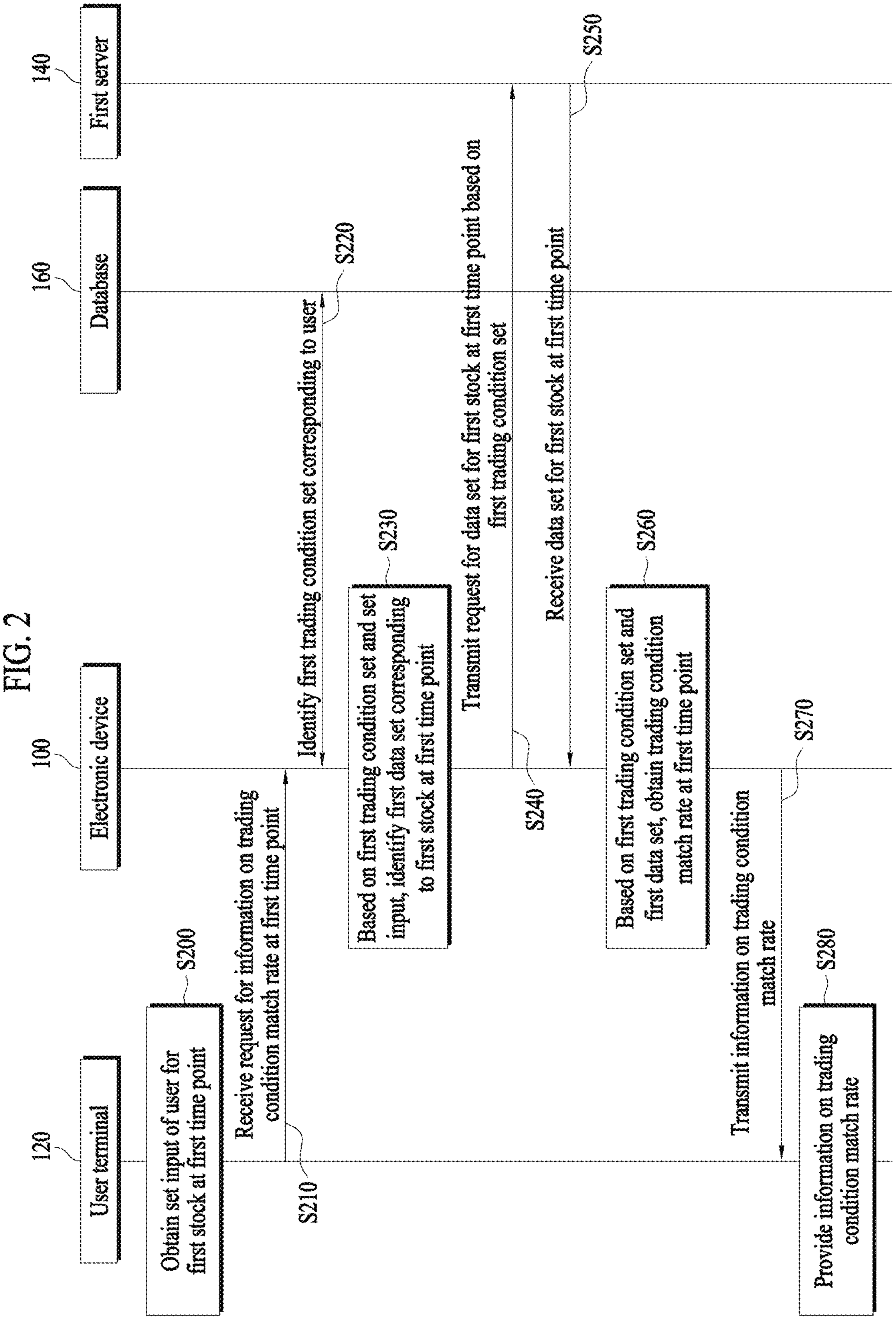
FIG. 2 is a diagram for illustrating a process of providing information on a trading condition match rate by an electronic device according to an example embodiment.

FIG. 2 is a diagram for illustrating a process of providing information on a trading condition match rate by the electronic device 100 according to an example embodiment.

In operation S200, the user terminal 120 may obtain a set input of a user for a first stock at a first time point according to an example embodiment. More specifically, the user terminal 120 may obtain a buying request input or a selling request input for the first stock or obtain an input of a request for identifying a trading condition match rate for the first stock. In the present disclosure, the buying request input and the selling request input may be briefly represented as a buying input and a selling input respectively, and the input of the request for identifying the trading condition match rate may also be briefly represented as an input for identifying a trading condition match rate.

For example, the user terminal 120 may obtain a user input for requesting buying the first stock at a price at the first time point or a user input for requesting selling the first stock at a price at the first time point. Alternatively, the user terminal 120 may obtain an input for requesting buying the first stock at a price inputted directly by the user at the first time point or an input for requesting selling the first stock at a price inputted directly by the user at the first time point. In this case, the first time point may be understood as a time point at which the user requests buying or selling or a time point corresponding to the selected location. However, in various example embodiments, the first time point may be earlier or later than the time point at which the user requests buying or selling based on selection by the user. With regard thereto, a specific example of a user interface provided by the electronic device 100 will be described in more detail with reference to FIGS. 3A to 3F.

For another example, the user terminal 120 may obtain a user input for selecting a specific location on a chart of the first stock provided to the user and requesting identifying a trading condition match rate at the first time point corresponding to the selected location. With regard thereto, a specific example of a user interface provided by the electronic device 100 will be described in more detail with reference to FIGS. 4A and 4B.

In operation S210, the electronic device 100 may receive a request for information on the trading condition match rate at the first time point from the user terminal 120 according to an example embodiment. For example, the user terminal 120 may transmit the request for the information on the trading condition match rate for the first stock at the first time point to the electronic device 100 in response to obtaining the set input of the user.

In operation S220, the electronic device 100 may identify a first trading condition set corresponding to the user, which is stored in the database 160, according to an example embodiment. For example, the electronic device 100 may retrieve one or more sets of trading conditions set by the user among a plurality of sets of trading conditions stored in the database 160 and identify the first trading condition set among the one or more sets of trading conditions. For another example, the electronic device 100 may also identify the first trading condition set among one or more sets of trading conditions that may be included within the request for the information on the trading condition match rate at the first time point received from the user terminal 120 in operation S210.

According to an example embodiment, a trading condition set may include one or more conditions regarding various types of indicators such as a trading price, a moving average line, a candle, a trading volume, a relative strength index (RSI), or a stochastic index. For example, the trading condition set may include a first trading condition regarding whether a moving average line is arranged in a set arrangement order, a second trading condition regarding whether a desired trading price is located above or below a moving average line, or a third trading condition regarding a disparity rate of a moving average line. Alternatively, the trading condition set may include a fourth trading condition regarding whether a candle is a positive candle or a negative candle, a fifth trading condition regarding a ratio of a current trading volume to an immediately previous trading volume, or a sixth trading condition regarding a reference value corresponding to a technical indicator. However, a specific example of an indicator that may be set as a criterion for trading is not limited to the above descriptions.

In operation S230, the electronic device 100 may, based on the first trading condition set and the set input, identify a first data set corresponding to the first stock at the first time point according to an example embodiment. More specifically, the electronic device 100 may, based on an indicator corresponding to each trading condition included in the first trading condition set, identify a data set required to obtain the trading condition match rate.

For example, when the first trading condition set includes the first trading condition regarding whether a moving average line is arranged in a set arrangement order, the electronic device 100 may identify data about an arrangement order of one or more moving average lines regarding the first stock at the first time point.

For another example, when the first trading condition set includes the second trading condition regarding whether a desired trading price is located above or below a moving average line, the electronic device 100 may identify data about a price inputted directly by the user or a price at the first time point and data about one or more moving average lines regarding the first stock at the first time point.

For another example, when the first trading condition set includes the third trading condition regarding a disparity rate of a moving average line, the electronic device 100 may identify data about one or more moving average values regarding the first stock at the first time point.

For another example, when the first trading condition set includes the fourth trading condition regarding whether a candle is a positive candle or a negative candle, the electronic device 100 may identify data about a candle of the first stock at the first time point.

For another example, when the first trading condition set includes the fifth trading condition regarding a ratio of a current trading volume to an immediately previous trading volume, the electronic device 100 may identify data about a trading volume of the first stock at the first time point and data about a trading volume of the first stock at a time point earlier than the first time point by a set time unit.

For another example, when the first trading condition set includes the sixth trading condition regarding a reference value corresponding to a technical indicator, the electronic device 100 may identify a value corresponding to a relative strength index (RSI) or a stochastic index of the first stock at the first time point.

In operation S240, the electronic device 100 may also transmit a request for a data set for the first stock at the first time point to the first server 140 based on the first trading condition set according to an example embodiment. More specifically, when it is identified in operation S230 that a data set about a specific trading condition in the first trading condition set is not stored in a memory or a cache within the electronic device 100, the electronic device 100 may transmit a request for the data set about the corresponding trading condition to the first server 140. In another example embodiment, in operation S230, when it is determined that the data set required for the indicator corresponding to each trading condition included in the first trading condition set is all identified, operation S240 may be omitted.

For example, the electronic device 100 may identify that the first trading condition set corresponding to the user includes a trading condition regarding an arrangement order of a 5-day moving average line, a 10-day moving average line, a 20-day moving average line, a 40-day moving average line, and an 80-day moving average line. The electronic device 100 may identify that the user is currently provided with information on the 5-day moving average line, the 10-day moving average line, the 20-day moving average line, a 60-day moving average line, and a 120-day moving average line and transmit a request for data about the 40-day moving average line and the 80-day moving average line regarding the first stock to the first server 140.

For another example, the electronic device 100 may identify that the first trading condition set corresponding to the user includes a trading condition regarding a volume profile. The electronic device 100 may identify that the user is not provided currently with information on the volume profile and transmit a request for data about the volume profile regarding the first stock at the first time point to the first server 140.

In operation S250, the electronic device 100 may also receive the data set for the first stock at the first time point from the first server 140 according to an example embodiment. For example, the first server 140 may transmit the data set for the first stock at the first time point to the electronic device 100 in response to receiving the request for the data set from the electronic device 100. In another example embodiment, when operation S240 is omitted, operation S250 may also be omitted.

Meanwhile, when the data set about the first trading condition set is all identified in the memory or the cache within the electronic device 100 in operation S230, the electronic device 100 may not perform operation S240 and operation S250.

In operation S260, the electronic device 100 may, based on the first trading condition set and the first data set, obtain the trading condition match rate at the first time point according to an example embodiment. More specifically, the electronic device 100 may, based on data corresponding to each trading condition included in the first trading condition set, obtain one or more sub-condition match rates corresponding to the each trading condition. Subsequently, the electronic device 100 may obtain the trading condition match rate based on the one or more sub-condition match rates.

For example, the electronic device 100 may determine a first sub-condition match rate corresponding to the first trading condition based on the number of arrangement matches between an arrangement order of one or more moving average lines regarding the first stock at the first time point and a set arrangement order. When the first trading condition includes a condition that a 5-day moving average line, a 10-day moving average line, a 20-day moving average line, a 60-day moving average line, and a 120-day moving average line are set to be arranged in sequence and when the 5-day moving average line, the 10-day moving average line, the 20-day moving average line, the 120-day moving average line, and the 60-day moving average line are arranged in sequence regarding the first stock at the first time point, the electronic device 100 may determine the first sub-condition match rate as 60 percent (%).

For another example, the electronic device 100 may determine a second sub-condition match rate corresponding to the second trading condition based on the number of moving average lines lower than a first price corresponding to the set input among one or more moving average lines. When the second trading condition includes a condition that a desired trading price is set to be located above a 5-day moving average line, a 10-day moving average line, a 20-day moving average line, a 60-day moving average line, and a 120-day moving average line and when the price inputted directly by the user or the price at the first time point is located above the 5-day moving average line and the 60-day moving average line and located below the 10-day moving average line, the 20-day moving average line, and the 120-day moving average line, the electronic device 100 may determine the second sub-condition match rate as 40%.

For another example, the electronic device 100 may determine a third sub-condition match rate corresponding to the third trading condition based on an average value of a variation ratio between an average value of one or more moving average values and each of the one or more moving average values. When the third trading condition includes a condition that a disparity rate of a moving average line is set to be less than a reference value (2%) and when a 5-day moving average value, a 10-day moving average value, and a 20-day moving average value are 166, 168, and 173 respectively, the electronic device 100 may identify that variation ratios between an average value ((166+168+173)/3=169) of the 5-day moving average value, the 10-day moving average value, and the 20-day moving average value and each of the 5-day moving average value, the 10-day moving average value, and the 20-day moving average value are 1.77% (=|(1−(166/169))*100|), 0.59% (=|(1−(168/169))*100|), and 2.3% (=|(1−(173/169))*100|). Subsequently, the electronic device 100 may identify that an average value (1.55=(1.77+0.59+2.3)/3) of the variation ratios is less than the reference value (2%) and thus determine the third sub-condition match rate as a set first value (for example, 100%).

For another example, the electronic device 100 may determine a fourth sub-condition match rate corresponding to the fourth trading condition based on whether a candle of the first stock at the first time point is a positive candle or a negative candle. When the candle of the first stock at the first time point is a candle of a type set as the fourth trading condition between the positive candle and the negative candle, the electronic device 100 may determine the fourth sub-condition match rate as a set first value (for example, 100%), and when the candle of the first stock at the first time point is not the candle of the type set as the fourth trading condition, the electronic device 100 may determine the fourth sub-condition match rate as a set second value (for example, 0%).

For another example, the electronic device 100 may determine a fifth sub-condition match rate corresponding to the fifth trading condition based on a ratio of a first trading volume of the first stock at the first time point to a second trading volume of the first stock at a time point earlier than the first time point by a set time unit. When a trading volume of the first stock at the first time point is 110 and a trading volume of the first stock at the time point earlier than the first time point by the set time unit is 120, the electronic device 100 may determine the fifth sub-condition match rate as 91% (=110*100/120). In this case, when the ratio between the first trading volume and the second trading volume is greater than or equal to 100%, the electronic device 100 may perform an additional scaling operation.

For another example, the electronic device 100 may determine a sixth sub-condition match rate corresponding to the sixth trading condition based on a value obtained by dividing a difference between a value corresponding to a first technical indicator of the first stock and a reference value by the reference value. When the sixth trading condition includes 27 as a reference value of a relative strength index (RSI) and an RSI value of the first stock at the first time point is 25, the electronic device 100 may determine the sixth sub-condition match rate corresponding to the sixth trading condition as 92.59% (=(27−|25−27|)/27*100).

According to an example embodiment, the electronic device 100 may obtain the trading condition match rate by applying a weight to each of the one or more sub-condition match rates. More specifically, the electronic device 100 may apply an identical weight to each of the one or more sub-condition match rates or may, based on trading history of the user, a rate of return in trading based on a trading condition corresponding to each of the one or more sub-condition match rates, or the number of times that the trading condition corresponding to each of the one or more sub-condition match rates is included in a trading condition set by the user, apply different weights to each of the one or more sub-condition match rates.

For example, when it is identified that the user has many histories of buying a corresponding stock when a ratio of a current trading volume to an immediately previous trading volume is high, the electronic device 100 may determine a buying condition match rate by assigning a higher weight to a sub-condition match rate corresponding to a condition regarding a ratio of a current trading volume to an immediately previous trading volume.

For another example, when it is identified that the user has many histories of selling a corresponding stock when a K indicator as a stochastic index falls to or below a set reference value, the electronic device 100 may determine a selling condition match rate by assigning a higher weight to a sub-condition match rate corresponding to a condition regarding a technical indicator.

For another example, when it is identified that a rate of return is high in buying a corresponding stock at a time point at which a disparity rate of a moving average line is less than or equal to a set reference, the electronic device 100 may determine a buying condition match rate by assigning a higher weight to a sub-condition match rate corresponding to a condition regarding a disparity rate of a moving average line.

For another example, when it is identified that a rate of return is high when the user buys a corresponding stock at a time point at which a trading condition match rate corresponding to a condition regarding whether a desired price is located above or below a moving average line is high, the electronic device 100 may determine a buying condition match rate by assigning a higher weight to a sub-condition match rate corresponding to a condition regarding whether a desired price is located above or below a moving average line.

For another example, when it is identified that the number of times that a trading condition regarding an arrangement order of a moving average line is included in a trading condition set by the user is high, the electronic device 100 may determine a trading condition match rate by assigning a higher weight to a sub-condition match rate corresponding to a condition regarding an arrangement order of a moving average line.

According to an example embodiment, the electronic device 100 may obtain a final trading condition match rate based on a plurality of trading condition match rates corresponding to each of a plurality of sets of trading conditions. For example, when a plurality of sets of trading conditions corresponding to the user are identified in operation S220, the electronic device 100 may identify a plurality of sets of data corresponding to each of the plurality of sets of trading conditions in operation S230 and obtain a plurality of trading condition match rates based on the plurality of sets of trading conditions and the plurality of sets of data in operation S260. Subsequently, the electronic device 100 may determine an average value, a mode, or a median of the plurality of trading condition match rates as a final trading condition match rate. For another example, the electronic device 100 may also determine a highest value or a lowest value among the plurality of trading condition match rates as the final trading condition match rate. However, a manner of determining a final trading condition match rate based on a plurality of trading condition match rates is not limited to the above descriptions.

In operation S270, the electronic device 100 may transmit information on the trading condition match rate to the user terminal 120 according to an example embodiment. For example, the electronic device 100 may transmit information on the final trading condition match rate or the plurality of trading condition match rates to the user terminal 120.

In operation S280, the user terminal 120 may provide the information on the trading condition match rate according to an example embodiment. For example, the user terminal 120 may provide the information on the final trading condition match rate or the plurality of trading condition match rates to the user based on the information received from the electronic device 100.

As above, when a user buys or sells a specific stock at a specific time point, the electronic device 100 may determine whether the corresponding time point is suitable for trading by comparing a data set at the corresponding time point and a data set corresponding to a previously stored trading condition set and provide information thereabout. Accordingly, the user may determine the suitability of trading without following temporary emotions or atmospheres by objectively evaluating whether the corresponding time point is suitable to buy or sell the corresponding stock.

Meanwhile, the above-described specific examples of a technical indicator included in a trading condition, a data set corresponding to the technical indicator, and a trading condition match rate are merely an example embodiment, and it is apparent to those of ordinary skill in the art to which the present disclosure pertains that the present disclosure may be implemented by examples different from the above examples.

FIGS. 3A to 3F illustrate an example of a user interface for providing information on a trading condition match rate provided by the electronic device 100 according to an example embodiment. In descriptions with reference to FIGS. 3A to 3F, duplicate content with the description with reference to FIG. 2 is briefly described or omitted.

According to an example embodiment, the electronic device 100 may identify a set input of a user for a first stock at a first time point. More specifically, the electronic device 100 may identify a buying input or a selling input of the user for the first stock at the first time point.

Figure 3A:
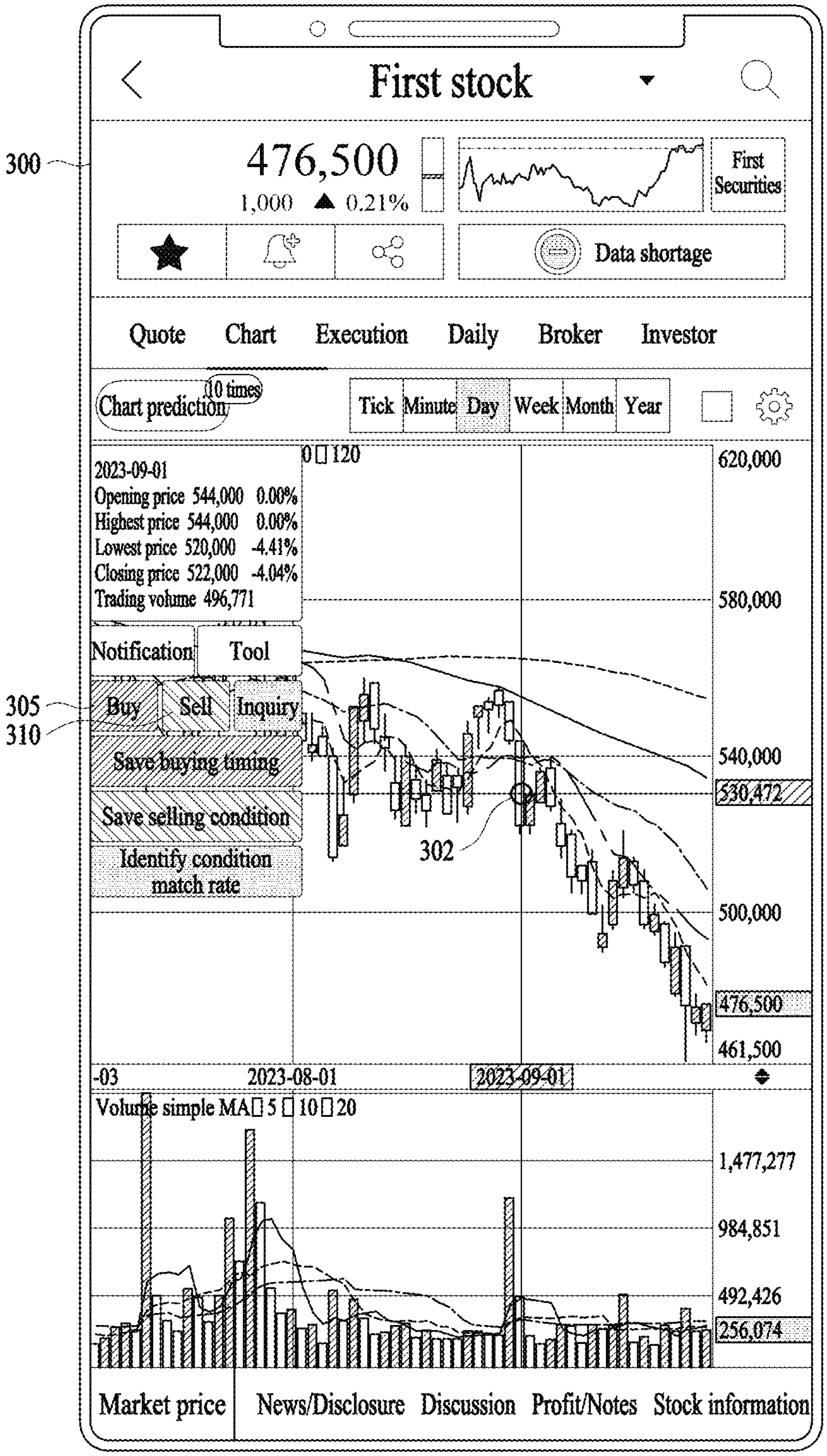
FIGS. 3A to 3F illustrate an example of a user interface for providing information on a trading condition match rate provided by an electronic device according to an example embodiment.

For example, referring to FIG. 3A, the user terminal 120 may display a user interface 300 including information on a chart of the first stock on a display based on information received from the electronic device 100. Subsequently, the user terminal 120 may obtain a user input for selecting a specific location 302 on the chart and obtain a user input for selecting a buy icon 305 or a sell icon 310.

Figure 3B:
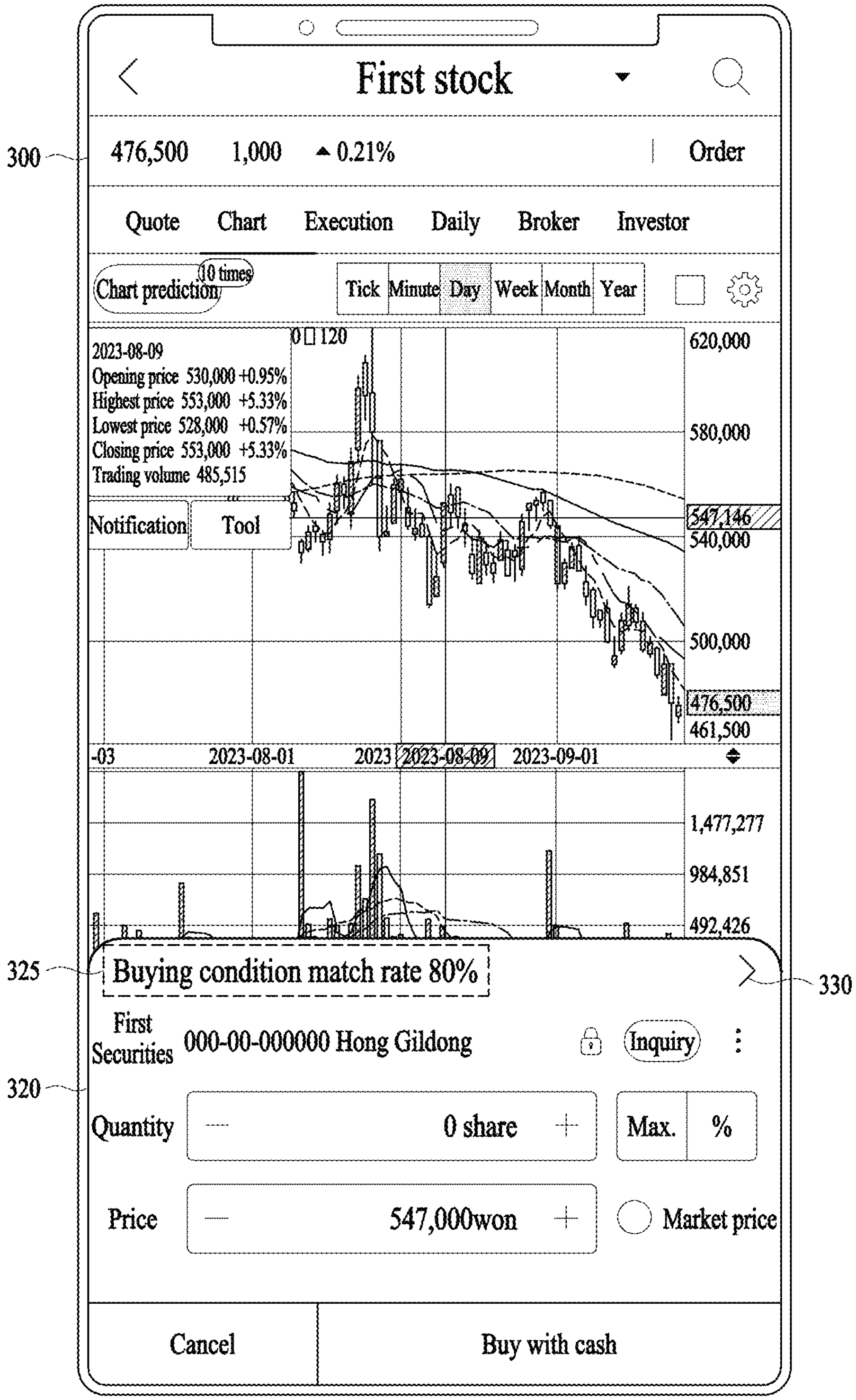
Figure 3C:
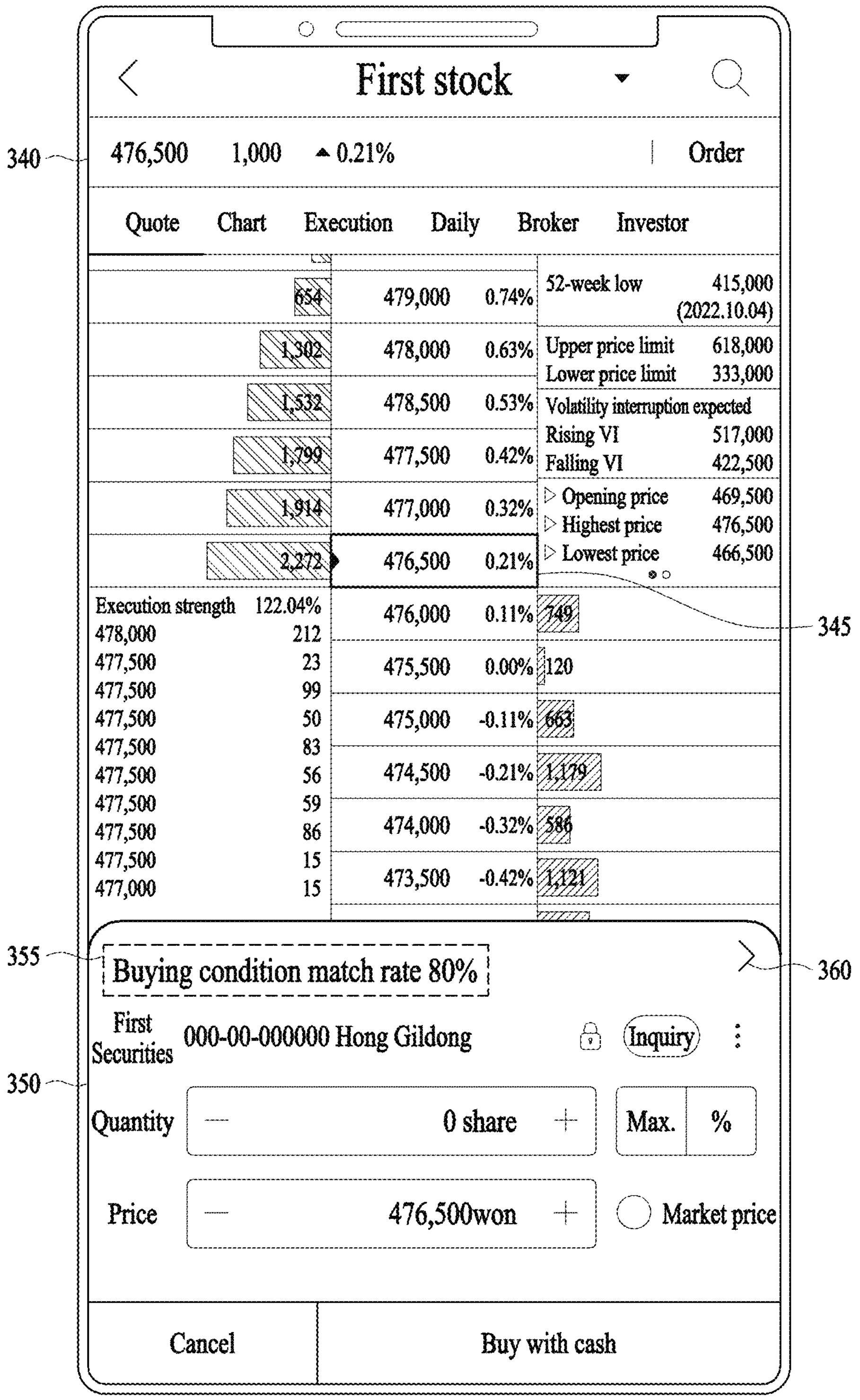

For another example, referring to FIG. 3C, the user terminal 120 may display a user interface 340 including quote information about the first stock on the display based on information received from the electronic device 100. Subsequently, the user terminal 120 may obtain a user input for selecting an area 345 corresponding to a specific price (476,500) in a list of quotes. In an example embodiment, a user input for selecting an area corresponding to an ask price in the list of quotes may be understood as the selling input, and a user input for selecting an area corresponding to a bid price may be understood as the buying input.

Figure 3D:
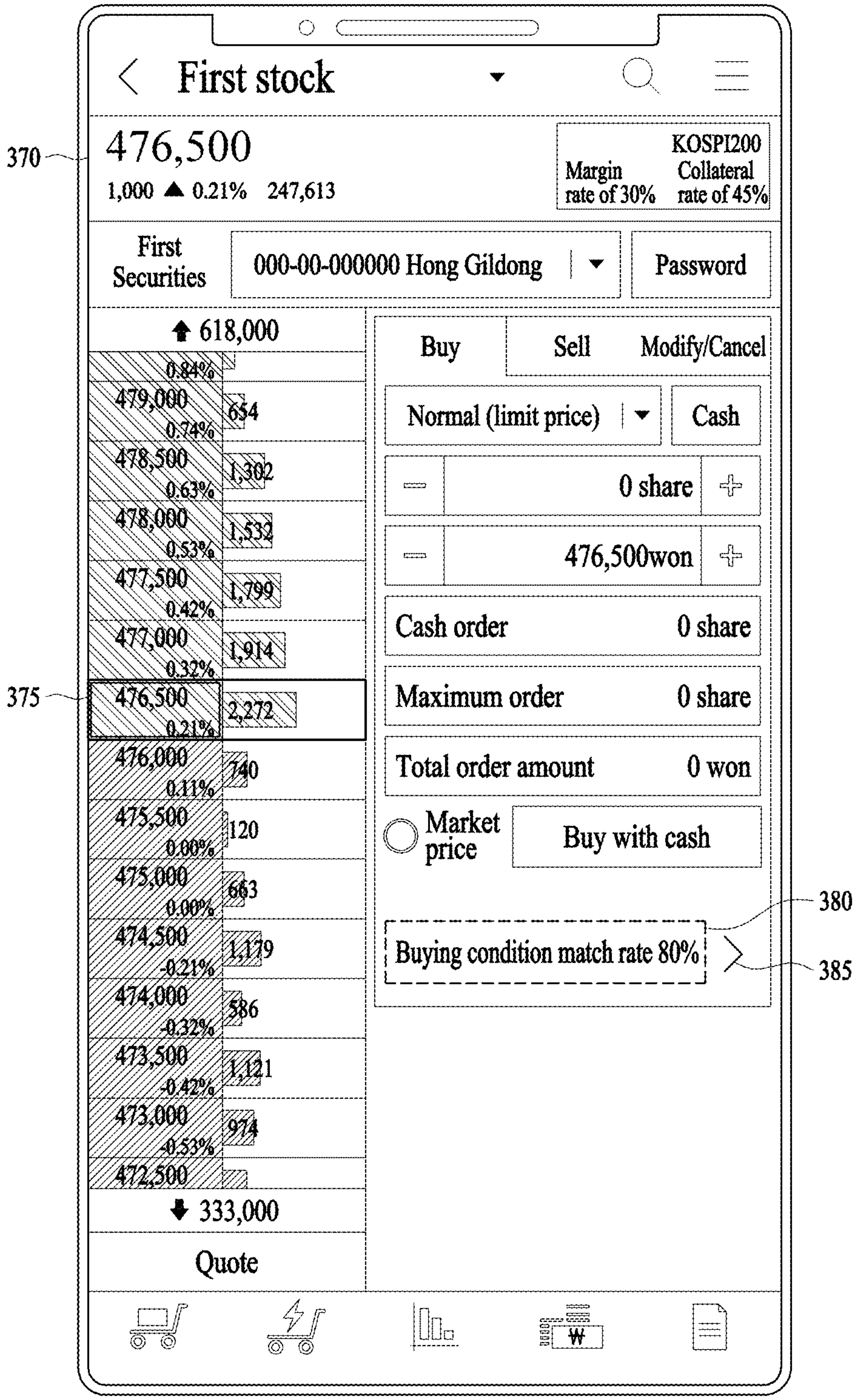

For another example, referring to FIG. 3D, the user terminal 120 may display a user interface 370 including quote information about the first stock on the display based on information received from the electronic device 100. Subsequently, the user terminal 120 may obtain a user input for selecting an area 375 corresponding to a specific price (476,500) in a list of quotes.

According to an example embodiment, the electronic device 100 may identify a first trading condition set corresponding to the user, which is stored in the database 160. For example, the electronic device 100 may retrieve one or more sets of trading conditions set by the user among a plurality of sets of trading conditions stored in the database 160 and identify the first trading condition set among the one or more sets of trading conditions.

According to an example embodiment, the electronic device 100 may, based on the first trading condition set and the set input, identify a first data set corresponding to the first stock at the first time point. For example, the electronic device 100 may, based on an indicator corresponding to each trading condition included in the first trading condition set, identify a data set required to obtain a trading condition match rate.

According to an example embodiment, the electronic device 100 may, based on the first trading condition set and the first data set, obtain the trading condition match rate at the first time point. For example, the electronic device 100 may, based on data corresponding to each trading condition included in the first trading condition set, obtain one or more sub-condition match rates corresponding to the each trading condition. Subsequently, the electronic device 100 may obtain the trading condition match rate based on the one or more sub-condition match rates.

According to an example embodiment, the electronic device 100 may provide information on the trading condition match rate through the user terminal 120. More specifically, the electronic device 100 may provide information on a final trading condition match rate or a plurality of trading condition match rates to the user.

For example, referring to FIG. 3B, the user terminal 120 may display a page 320 including an area 325 displaying the information on the trading condition match rate on the display based on information received from the electronic device 100. In addition, referring to FIGS. 3B, 3E, and 3F, the user terminal 120 may, in response to obtaining a user input for selecting an arrow icon 330, display popup windows 390 and 395 that display information on a first buying condition match rate, a second buying condition match rate, a third buying condition match rate, a fourth buying condition match rate, and a final buying condition match rate on the display.

For another example, referring to FIG. 3C, the user terminal 120 may display a page 350 including an area 355 displaying the information on the trading condition match rate on the display based on information received from the electronic device 100. In addition, referring to FIGS. 3C, 3E, and 3F, the user terminal 120 may, in response to obtaining a user input for selecting an arrow icon 360, display the popup windows 390 and 395 that display the information on the first buying condition match rate, the second buying condition match rate, the third buying condition match rate, the fourth buying condition match rate, and the final buying condition match rate on the display.

For another example, referring to FIG. 3D, the user terminal 120 may display an area 380 displaying the information on the trading condition match rate on the display based on information received from the electronic device 100. In addition, referring to FIGS. 3D, 3E, and 3F, the user terminal 120 may, in response to obtaining a user input for selecting an arrow icon 385, display the popup windows 390 and 395 that display the information on the first buying condition match rate, the second buying condition match rate, the third buying condition match rate, the fourth buying condition match rate, and the final buying condition match rate on the display.

Figure 3E:
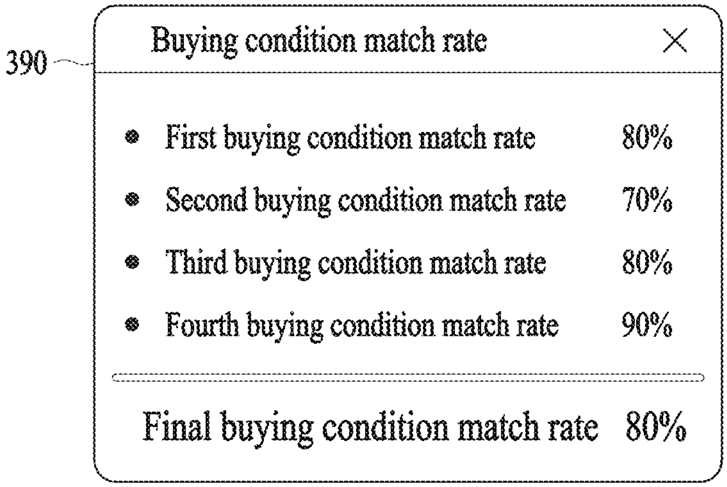
Figure 3F:
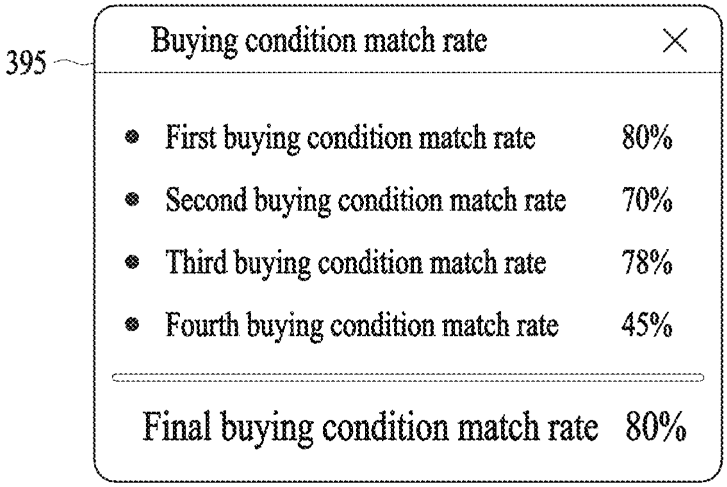

In this case, the final trading condition match rate may be determined as an average value of the plurality of trading condition match rates as illustrated in FIG. 3E or may be determined as a highest value among the plurality of trading condition match rates as illustrated in FIG. 3F, but a manner of determining a final trading condition match rate is not limited to the above descriptions.

Meanwhile, the above-described specific examples of the types of user interface components and data about a stock are merely an example embodiment, and it is apparent to those of ordinary skill in the art to which the present disclosure pertains that the present disclosure may be implemented by examples different from the above examples.

Figure 4A:
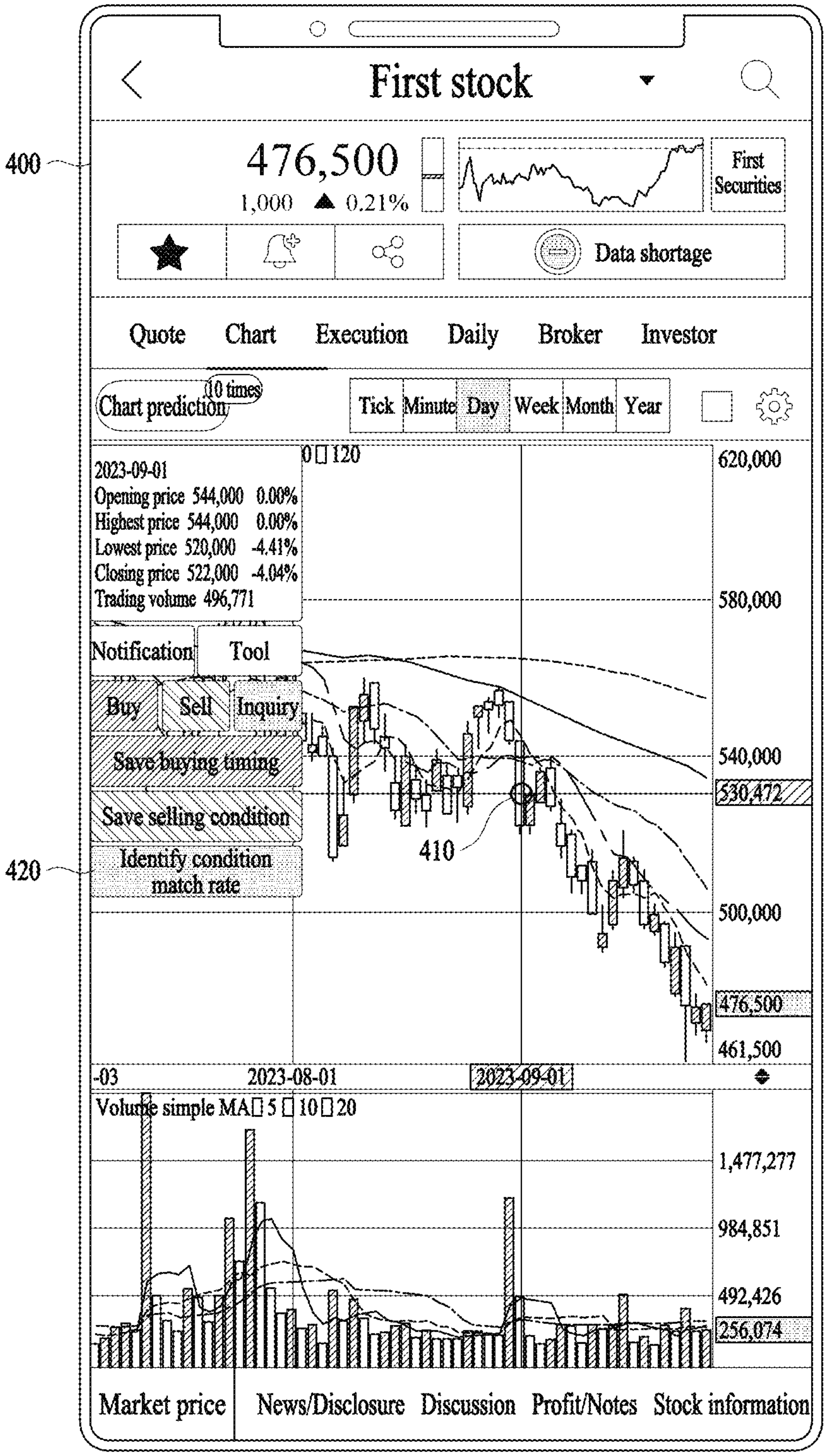
FIGS. 4A and 4B illustrate an example of a user interface for providing information on a trading condition match rate provided by an electronic device according to another example embodiment.
Figure 4B:
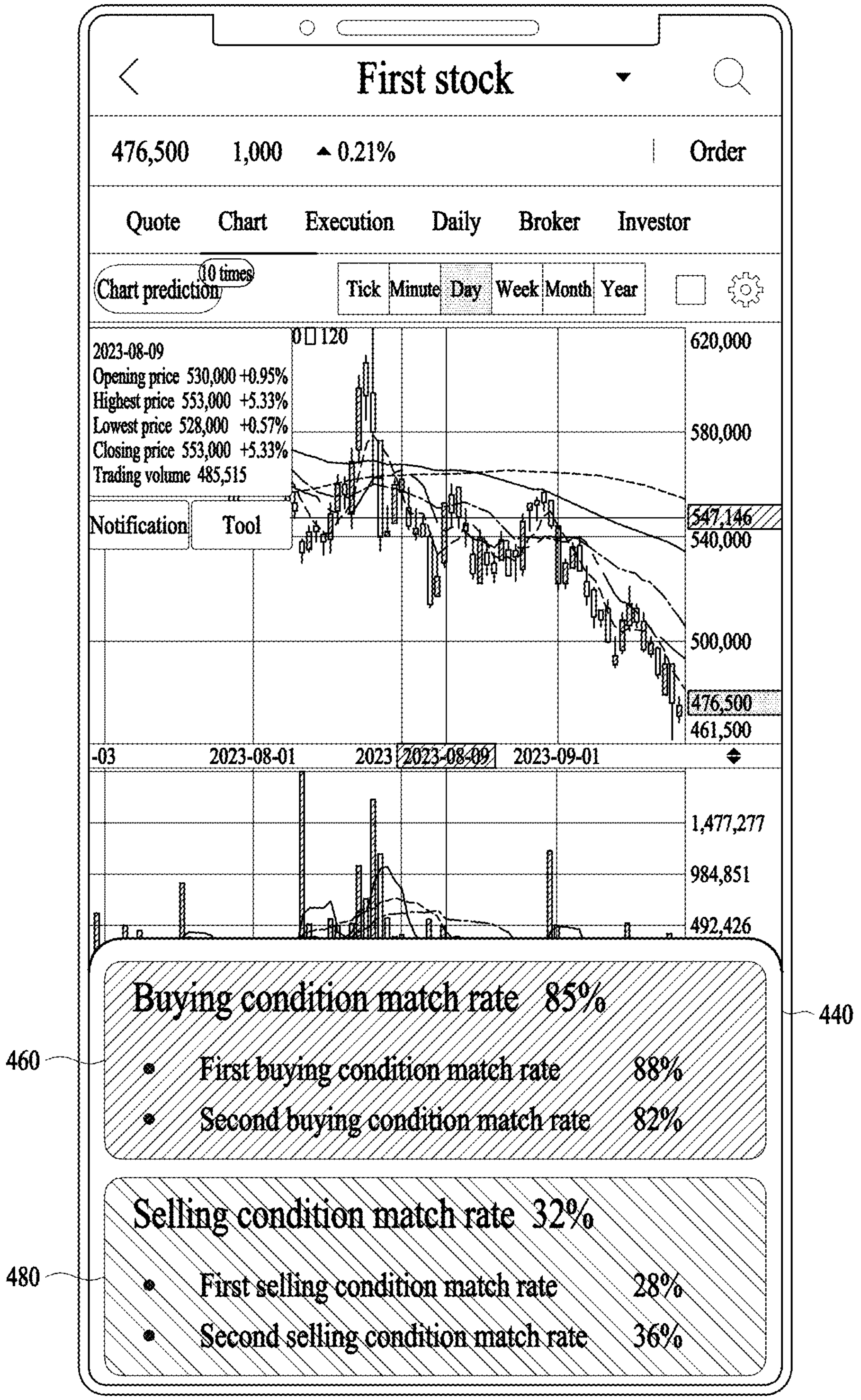

FIGS. 4A and 4B illustrate an example of a user interface for providing information on a trading condition match rate provided by the electronic device 100 according to another example embodiment. In descriptions with reference to FIGS. 4A and 4B, duplicate content with the description with reference to FIG. 2 is briefly described or omitted.

According to an example embodiment, the electronic device 100 may identify a set input of a user for a first stock at a first time point. More specifically, the electronic device 100 may identify a user input for identifying a trading condition match rate for the first stock at the first time point.

For example, referring to FIG. 4A, the user terminal 120 may display a user interface 400 including information on a chart of the first stock on a display based on information received from the electronic device 100. Subsequently, the user terminal 120 may obtain a user input for selecting a specific location 410 on the chart and obtain a user input for selecting an icon 420 for identifying a condition match rate.

According to an example embodiment, the electronic device 100 may identify a first trading condition set corresponding to the user, which is stored in the database 160. For example, the electronic device 100 may retrieve one or more sets of trading conditions set by the user among a plurality of sets of trading conditions stored in the database 160 and identify the first trading condition set among the one or more sets of trading conditions.

According to an example embodiment, the electronic device 100 may, based on the first trading condition set and the set input, identify a first data set corresponding to the first stock at the first time point. For example, the electronic device 100 may, based on an indicator corresponding to each trading condition included in the first trading condition set, identify a data set required to obtain the trading condition match rate. In this case, the first time point may be understood as a time point corresponding to the selected location 410.

According to an example embodiment, the electronic device 100 may, based on the first trading condition set and the first data set, obtain the trading condition match rate at the first time point. For example, the electronic device 100 may, based on data corresponding to each trading condition included in the first trading condition set, obtain one or more sub-condition match rates corresponding to the each trading condition. Subsequently, the electronic device 100 may obtain the trading condition match rate based on the one or more sub-condition match rates.

According to an example embodiment, the electronic device 100 may provide information on the trading condition match rate through the user terminal 120. More specifically, the electronic device 100 may provide information on a final trading condition match rate or a plurality of trading condition match rates to the user.

For example, referring to FIG. 4B, the user terminal 120 may display a page 440 including an area 460 displaying information on a buying condition match rate and an area 480 displaying information on a selling condition match rate on the display based on information received from the electronic device 100.

Meanwhile, the above-described specific examples of the types of user interface components and data about a stock are merely an example embodiment, and it is apparent to those of ordinary skill in the art to which the present disclosure pertains that the present disclosure may be implemented by examples different from the above examples.

Figure 5:
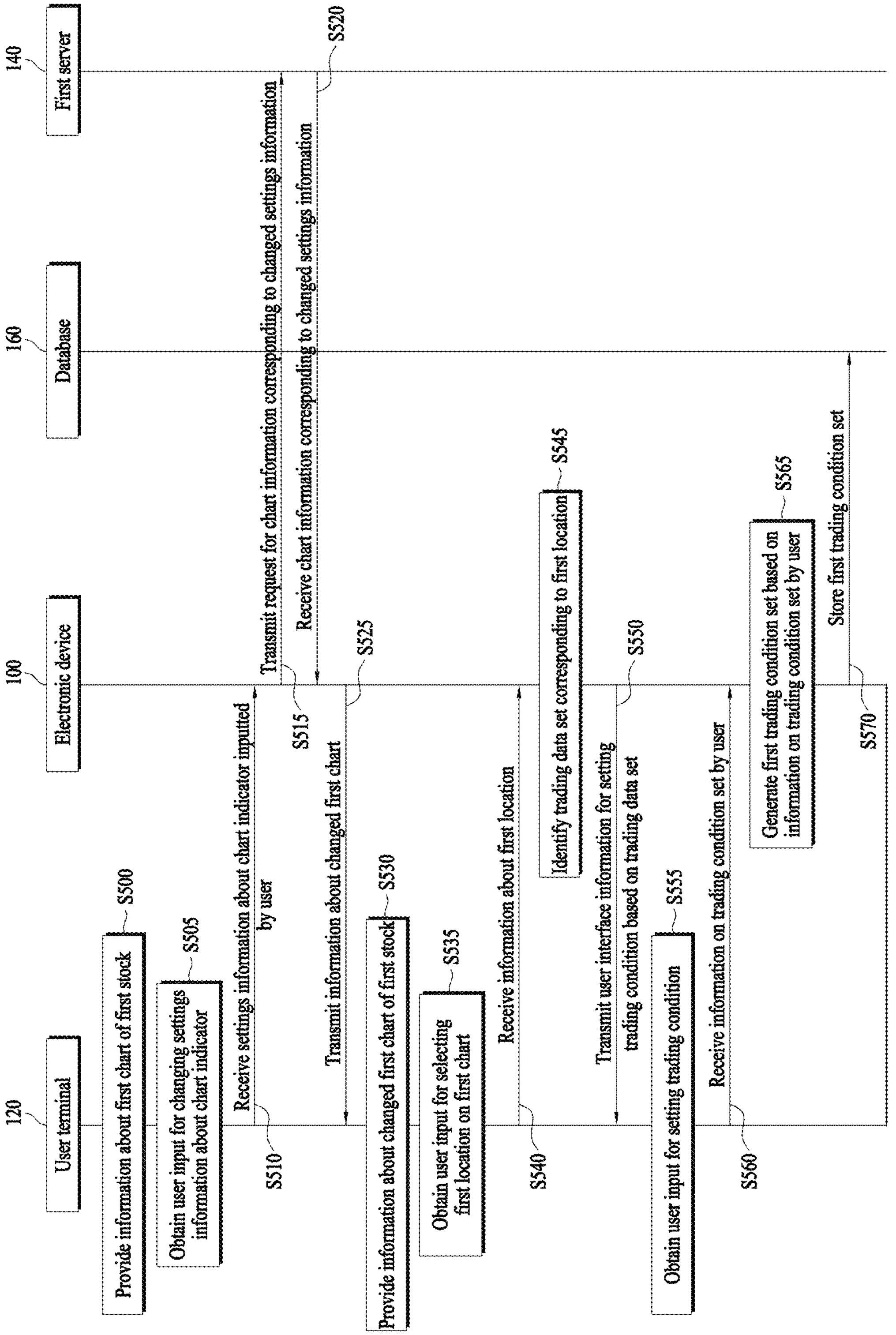
FIG. 5 is a diagram for illustrating a process of storing information about a trading condition set by an electronic device according to an example embodiment.

FIG. 5 is a diagram for illustrating a process of storing information about a trading condition set by the electronic device 100 according to an example embodiment.

In operation S500, the user terminal 120 may provide information about a first chart of a first stock according to an example embodiment. For example, the user terminal 120 may transmit a request for information about a chart of the first stock to the electronic device 100 based on an input from a user. Accordingly, the electronic device 100 may transmit the request for information about the chart of the first stock to the first server 140 and receive the information about the chart of the first stock from the first server 140.

Subsequently, the user terminal 120 may display a user interface including the information about the chart of the first stock on a display based on information received from the electronic device 100.

In operation S505, the user terminal 120 may obtain a user input for changing settings information about a chart indicator. For example, the user terminal 120 may obtain a user input for setting a technical indicator displayed on the user interface or a user input for changing a time unit corresponding to a candle on the chart. With regard thereto, a specific example of the user interface provided by the electronic device 100 will be described in more detail with reference to FIGS. 7A to 7E. However, operation S505 may also be omitted together with operation S510 to operation S530 associated with operation S505.

In operation S510, the electronic device 100 may receive the settings information about the chart indicator inputted by the user from the user terminal 120 according to an example embodiment. For example, the user terminal 120 may transmit information on a technical indicator set to be displayed on the user interface by the user or information on a time unit corresponding to a candle which is changed by the user to the electronic device 100.

In operation S515, the electronic device 100 may transmit a request for chart information corresponding to changed settings information to the first server 140 according to an example embodiment. For example, when it is identified that chart information corresponding to changed settings information is not stored in a memory or a cache within the electronic device 100, the electronic device 100 may transmit a request for the corresponding chart information to the first server 140.

In operation S520, the electronic device 100 may receive the chart information corresponding to the changed settings information from the first server 140 according to an example embodiment. For example, the first server 140 may transmit the chart information corresponding to the changed settings information to the electronic device 100 in response to receiving the request for the chart information from the electronic device 100.

In operation S525, the electronic device 100 may transmit information about a changed first chart to the user terminal 120 according to an example embodiment. For example, the electronic device 100 may transmit the information about the changed first chart in a form that may be displayed on a web page or an application screen to the user terminal 120 based on information received from the first server 140.

In operation S530, the user terminal 120 may provide the information about the changed first chart of the first stock according to an example embodiment. For example, the user terminal 120 may display a user interface including information about a changed chart of the first stock on the display based on information received from the electronic device 100.

Meanwhile, when the settings information about the chart indicator is not changed by the user in operation S505, the electronic device 100 may not perform operation S510 to operation S530.

In operation S535, the user terminal 120 may obtain a user input for selecting a first location on the first chart according to an example embodiment. For example, the user terminal 120 may obtain a user input for locating a cross-line at the first location on the first chart of the first stock.

In operation S540, the electronic device 100 may receive information about the first location from the user terminal 120 according to an example embodiment. For example, the user terminal 120 may transmit the information about the first location selected by the user to the electronic device 100. In various example embodiments, the information about the first location may include at least one of coordinate value information about the first location within the first chart, information associated with a point on a graph within the first chart corresponding to the first location, or indicator value information corresponding to the point.

In operation S545, the electronic device 100 may identify a trading data set corresponding to the first location according to an example embodiment. More specifically, the electronic device 100 may identify data corresponding to various types of indicators of the first stock at the first location or a first time point corresponding to the first location.

For example, the electronic device 100 may identify an arrangement order of moving average lines regarding the first stock at the first time point, data about whether a price of the first stock at the first time point is located above or below a moving average line, or data about one or more moving average values regarding the first stock at the first time point. Alternatively, the electronic device 100 may identify data about a candle of the first stock at the first time point or a value corresponding to an RSI value or a stochastic index of the first stock at the first time point.

In operation S550, the electronic device 100 may transmit user interface information for setting a trading condition based on the trading data set to the user terminal 120 according to an example embodiment. For example, the electronic device 100 may transmit the user interface information for setting the trading condition based on data corresponding to the various types of indicators of the first stock at the first time point to the user terminal 120.

In operation S555, the user terminal 120 may obtain a user input for setting the trading condition. For example, the user terminal 120 may display a user interface including a list of a plurality of trading conditions corresponding to the identified trading data set on the display based on information received from the electronic device 100. Subsequently, the user terminal 120 may obtain a user input for selecting one or more trading conditions among the plurality of trading conditions.

In operation S560, the electronic device 100 may receive information on the trading condition set by the user from the user terminal 120 according to an example embodiment. For example, the user terminal 120 may transmit information on the one or more trading conditions selected by the user among the plurality of trading conditions to the electronic device 100.

In operation S565, the electronic device 100 may generate a first trading condition set based on the information on the trading condition set by the user according to an example embodiment. For example, the electronic device 100 may generate the first trading condition set including the one or more trading conditions selected by the user.

In operation S570, the electronic device 100 may store the first trading condition set in the database 160 according to an example embodiment. For example, the electronic device 100 may store information on the first trading condition set including the information on the one or more trading conditions and identification information of the user in the database 160.

FIGS. 6A to 6D illustrate an example of a user interface for setting a trading condition provided by the electronic device 100 according to an example embodiment. In descriptions with reference to FIGS. 6A to 6D, duplicate content with the description with reference to FIG. 5 is briefly described or omitted.

According to an example embodiment, the electronic device 100 may provide information about a first chart of a first stock to a user. For example, referring to FIG. 6A, the user terminal 120 may display a user interface 600 including information on a chart of the first stock on a display based on information received from the electronic device 100.

According to an example embodiment, the electronic device 100 may identify a location selected by the user on the chart of the first stock. For example, referring to FIG. 6B, the user terminal 120 may obtain a user input for locating a cross-line at a first location on the first chart of the first stock and a user input for selecting an icon 610 for saving a buying condition or an icon 620 for saving a selling condition. Subsequently, the user terminal 120 may transmit information about the first location corresponding to the cross-line and a request for a user interface for setting a trading condition to the electronic device 100.

According to an example embodiment, the electronic device 100 may identify a trading data set corresponding to the first location. For example, the electronic device 100 may identify data corresponding to various types of indicators of the first stock at the first location or a first time point.

According to an example embodiment, the electronic device 100 may provide a user interface 630 for setting the trading condition based on the trading data set to the user. More specifically, the electronic device 100 may provide the user interface 630 including a list of a plurality of trading conditions corresponding to the identified trading data set.

For example, referring to FIG. 6C, the user interface 630 may include an area 635 for setting a condition regarding whether a current price is located above or below one or more moving average lines. The electronic device 100 may identify that a price at the first time point is located below a 5-day moving average line, a 10-day moving average line, and a 60-day moving average line and above a 20-day moving average line and a 120-day moving average line and may display information thereabout in the area 635.

Figure 6A:
FIGS. 6A to 6D illustrate an example of a user interface for setting a trading condition provided by an electronic device according to an example embodiment.
Figure 6B:
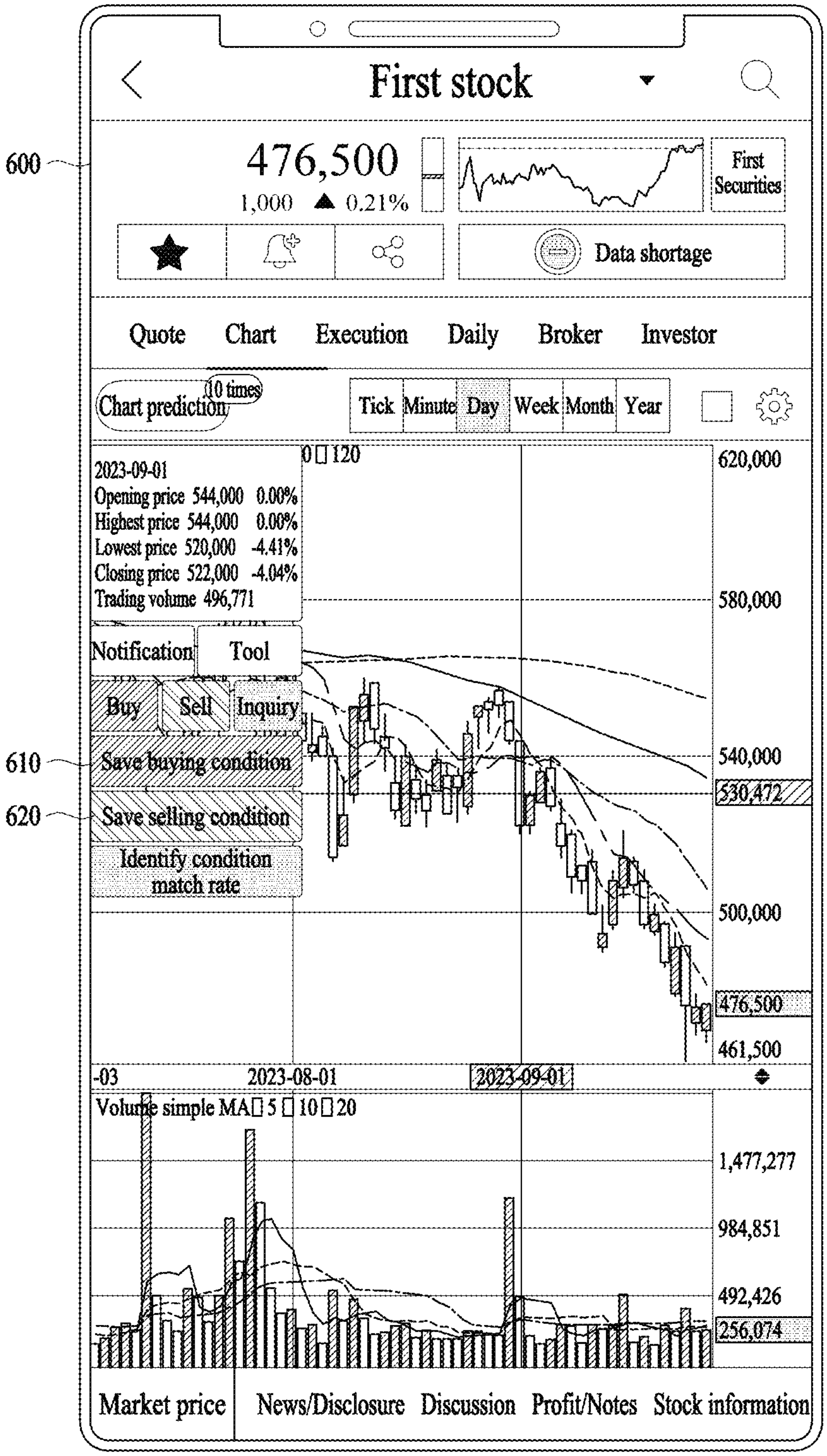
Figure 6C:
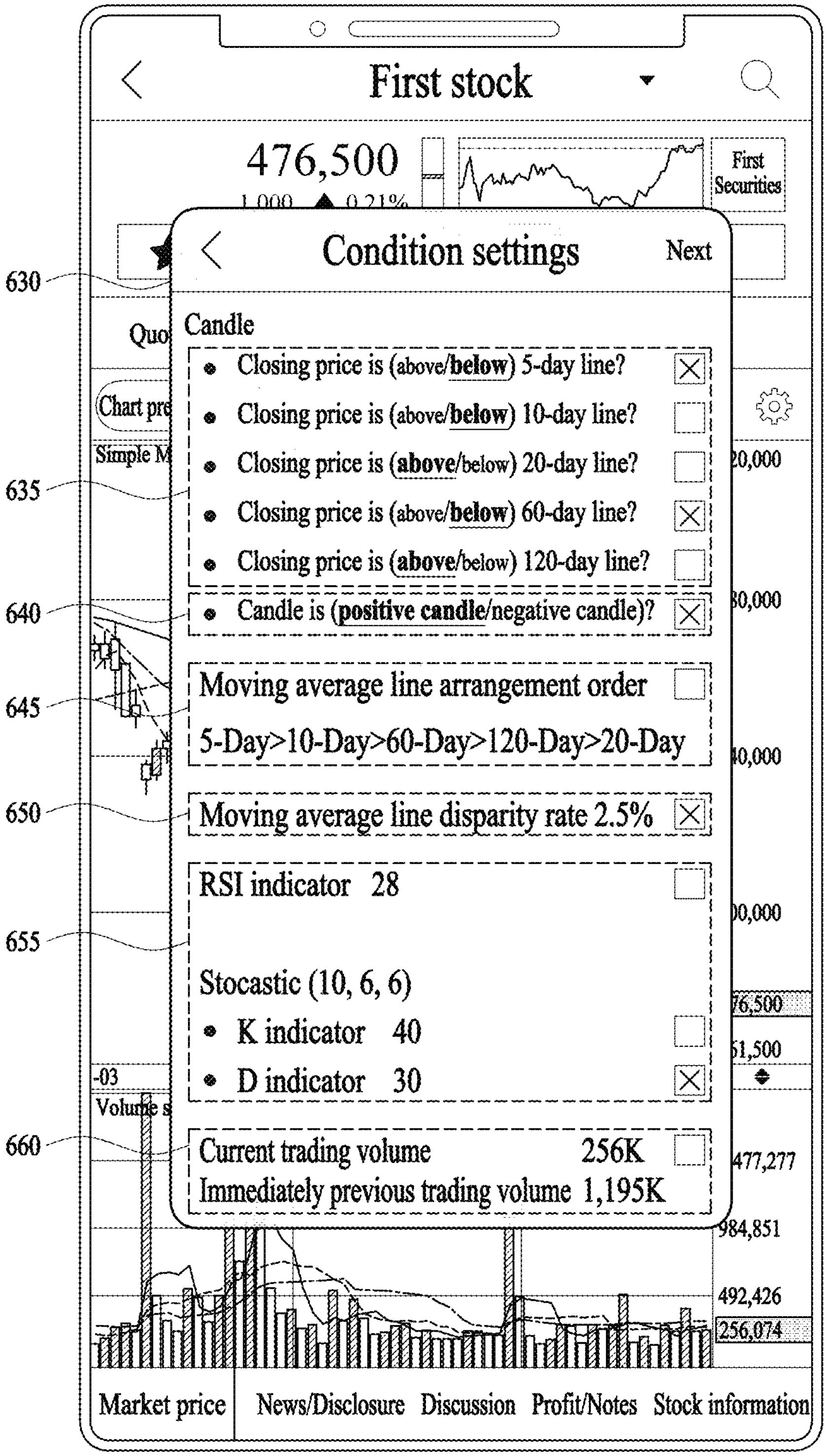
Figure 6D:
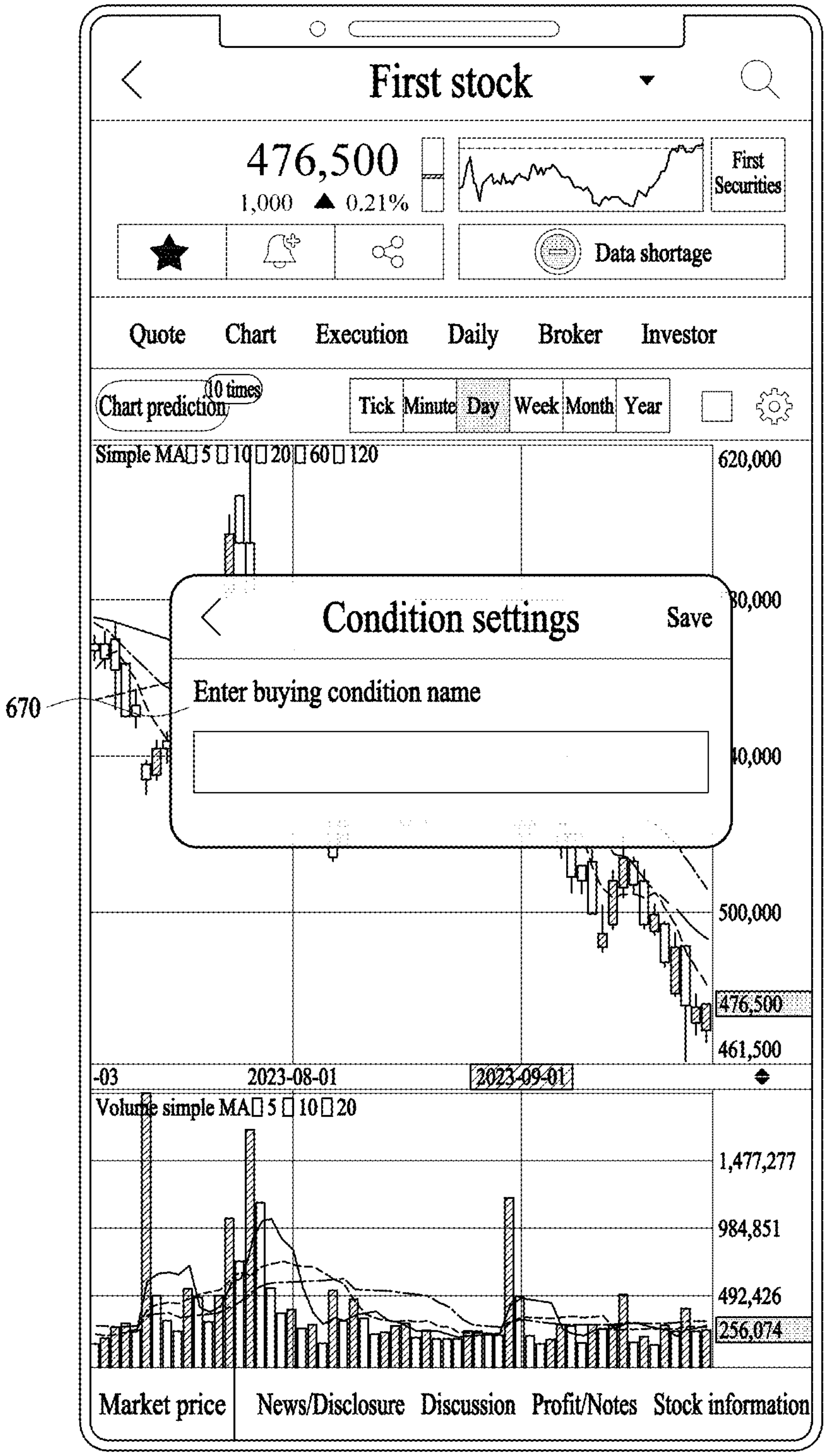
Figure 7A:
FIGS. 7A to 7E illustrate an example of a user interface for setting a chart indicator provided by an electronic device according to an example embodiment.
Figure 7B:
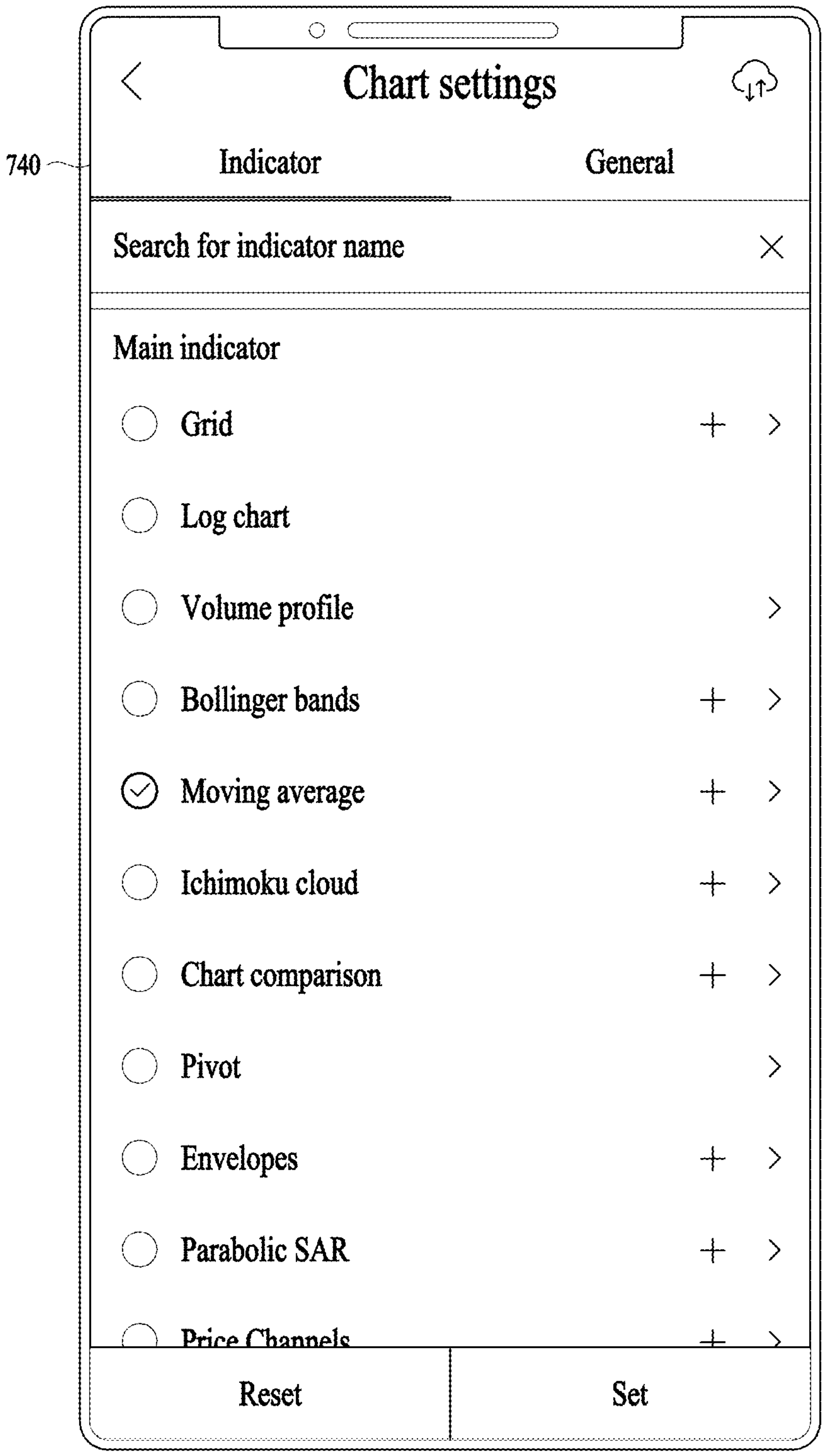
Figure 7C:
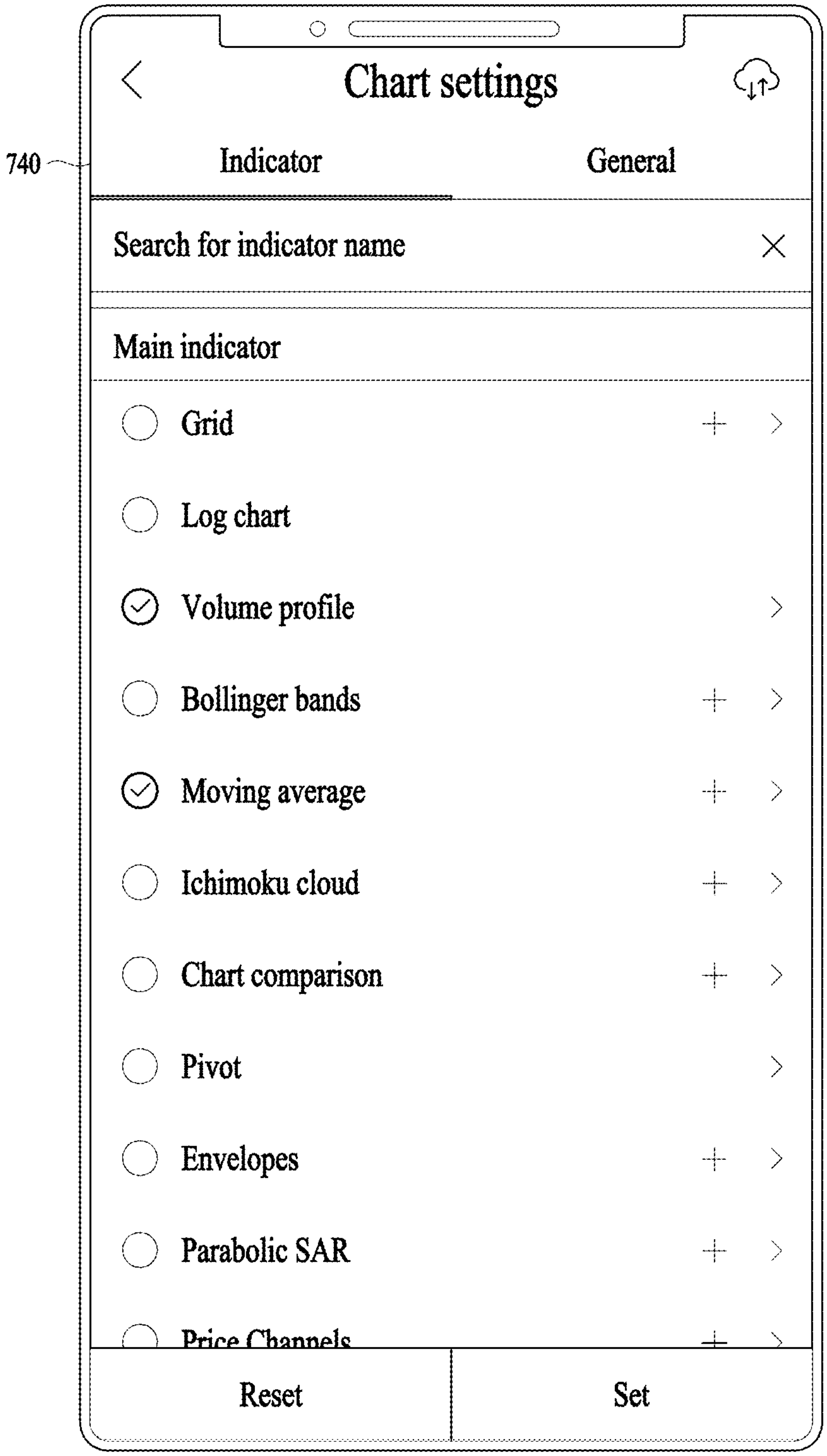
Figure 7D:
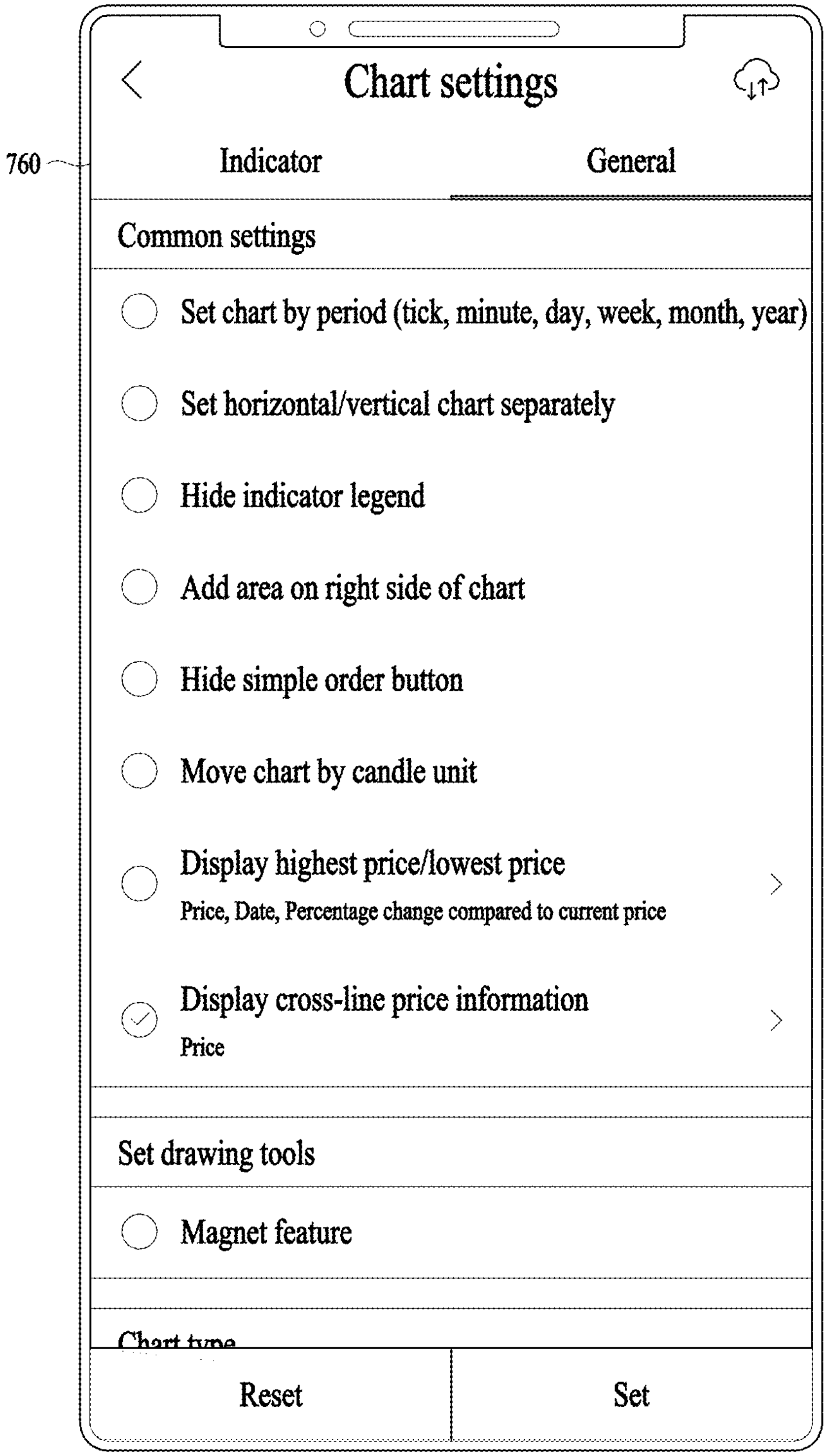
Figure 7E:
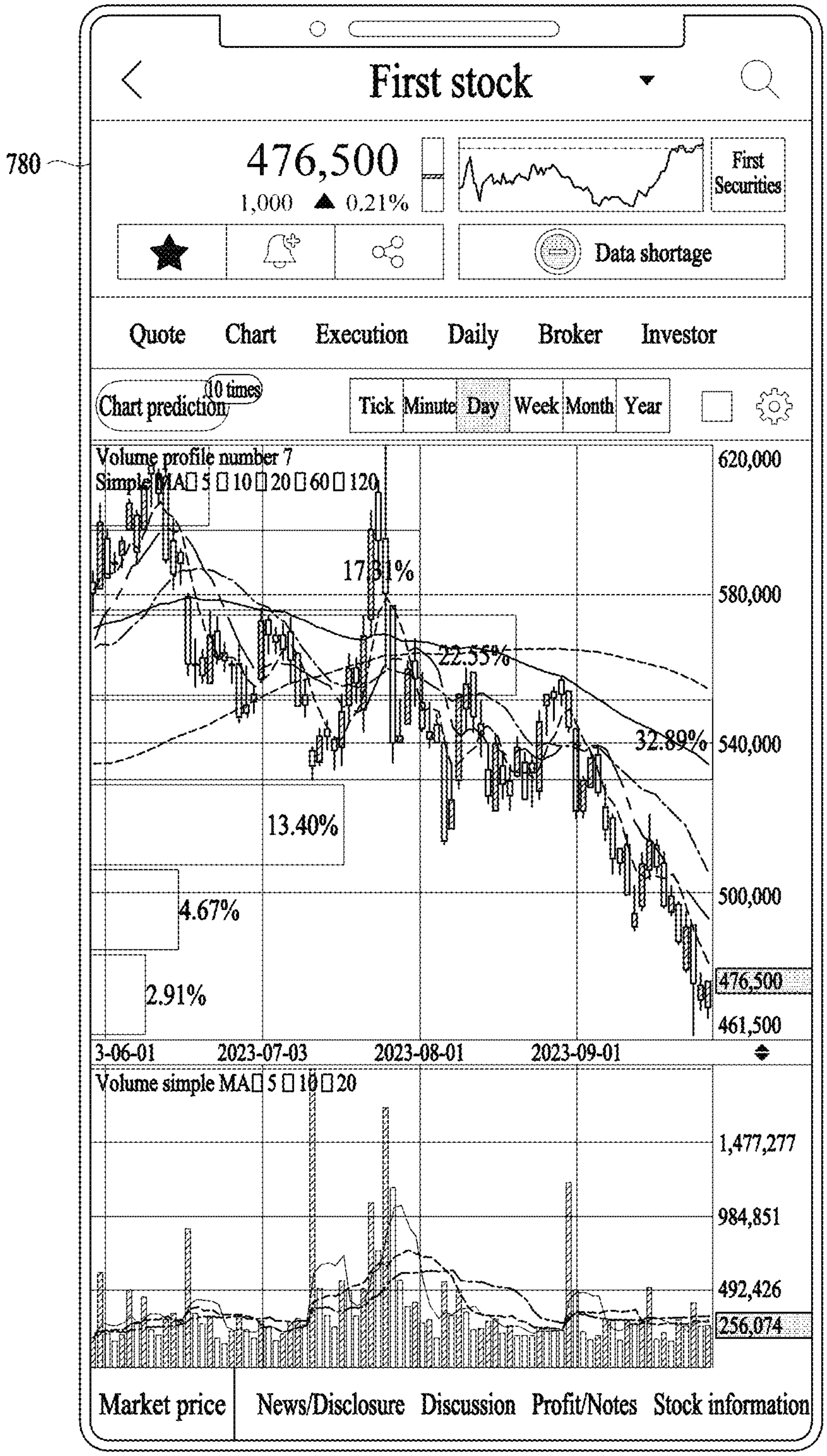

For another example, referring to FIG. 6C, the user interface 630 may include an area 640 for setting a condition regarding whether a candle is a positive candle or a negative candle. The electronic device 100 may identify that a candle at the first time point is the positive candle and may display information thereabout in the area 640.

For another example, referring to FIG. 6C, the user interface 630 may include an area 645 for setting a condition regarding whether a moving average line is arranged in a set arrangement order. The electronic device 100 may identify that a 5-day moving average line, a 10-day moving average line, and a 60-day moving average line, a 120-day moving average line, and a 20-day moving average line are arranged in sequence at the first time point and may display information thereabout in the area 645.

For another example, referring to FIG. 6C, the user interface 630 may include an area 650 for setting a condition regarding a disparity rate of a moving average line. The electronic device 100 may identify that an average value of a variation ratio between an average value of one or more moving average values and each of the one or more moving average values is 2.5% at the first time point and may display information thereabout in the area 650.

For another example, referring to FIG. 6C, the user interface 630 may include an area 655 for setting a condition regarding a reference value corresponding to a technical indicator. The electronic device 100 may identify that an RSI indicator value, a K indicator value, and a D indicator value at the first time point are 28, 40, and 30 respectively and may display information thereabout in the area 655.

For another example, referring to FIG. 6C, the user interface 630 may include an area 660 for setting a condition regarding a ratio of a current trading volume to an immediately previous trading volume. The electronic device 100 may identify that a trading volume at the first time point is about 256,000 and a trading volume of the first stock at a time point earlier than the first time point by a set time unit is about 1,195,000 and may display information thereabout in the area 660.

According to an example embodiment, the electronic device 100 may receive information on a trading condition set by the user from the user terminal 120. More specifically, the user terminal 120 may obtain a user input for selecting one or more trading conditions among a plurality of trading conditions and transmit information on the one or more trading conditions selected by the user among the plurality of trading conditions to the electronic device 100.

For example, referring to FIG. 6C, the user terminal 120 may obtain a user input for selecting a checkbox corresponding to each of a condition that a closing price is located below the 5-day moving average line, a condition that the closing price is located below the 60-day moving average line, a condition regarding whether the disparity rate of the moving average line is less than a reference value (2.5%), and a condition regarding a ratio between the D indicator value and a reference value (30) and a user input for selecting a next icon. Subsequently, referring to FIG. 6D, the user terminal 120 may obtain a user input for entering a name of a set of buying conditions in a popup window 670 and transmit information on the condition selected by the user and the name inputted by the user to the electronic device 100.

According to an example embodiment, the electronic device 100 may generate a trading condition set based on information on the trading condition set by the user. For example, the electronic device 100 may generate the trading condition set with a name inputted by the user, including the one or more trading conditions selected by the user.

According to an example embodiment, the electronic device 100 may store the trading condition set in the database 160. For example, the electronic device 100 may store information on the trading condition set including information on the one or more trading conditions and identification information of the user in the database 160.

Meanwhile, the above-described specific examples of the types of user interface components and data about a stock are merely an example embodiment, and it is apparent to those of ordinary skill in the art to which the present disclosure pertains that the present disclosure may be implemented by examples different from the above examples.

FIGS. 7A to 7E illustrate an example of a user interface for setting a chart indicator provided by the electronic device 100 according to an example embodiment. For example, with reference to FIGS. 7A to 7E, operations performed when a user changes settings information about a chart indicator in operation S505 to operation S530 of FIG. 5 may be described. In descriptions with reference to FIGS. 7A to 7E, duplicate content with the description with reference to FIG. 5 is briefly described or omitted.

According to an example embodiment, the electronic device 100 may provide information about a first chart of a first stock to a user. For example, referring to FIG. 7A, the user terminal 120 may display a user interface 700 including information on a chart of the first stock on a display based on information received from the electronic device 100.

According to an example embodiment, the electronic device 100 may provide user interfaces 740 and 760 for changing settings information about a chart indicator. For example, referring to FIG. 7A, the user terminal 120 may obtain a user input for selecting a settings icon 720 and transmit a request for a user interface for changing the settings information about the chart indicator to the electronic device 100. Subsequently, referring to FIGS. 7B to 7D, the user terminal 120 may display the user interfaces 740 and 760 for changing the settings information about the chart indicator on the display based on information received from the electronic device 100.

According to an example embodiment, the electronic device 100 may identify a user input for changing the settings information about the chart indicator. For example, referring to FIGS. 7B to 7D, the user terminal 120 may obtain a user input for selecting a volume profile among a plurality of chart indicators included in the user interface and transmit information about the volume profile selected by the user to the electronic device 100.

According to an example embodiment, the electronic device 100 may provide information about a changed first chart of a first stock to a user. For example, the electronic device 100 may transmit information on a chart including the information about the volume profile selected by the user in a form that may be displayed on a web page or an application screen to the user terminal 120. Subsequently, referring to FIG. 7E, the user terminal 120 may display a user interface 780 including the information on the chart including the information about the volume profile on the display based on information received from the electronic device 100.

Meanwhile, the above-described specific examples of the types of user interface components and data about a stock are merely an example embodiment, and it is apparent to those of ordinary skill in the art to which the present disclosure pertains that the present disclosure may be implemented by examples different from the above examples.

Figure 8:
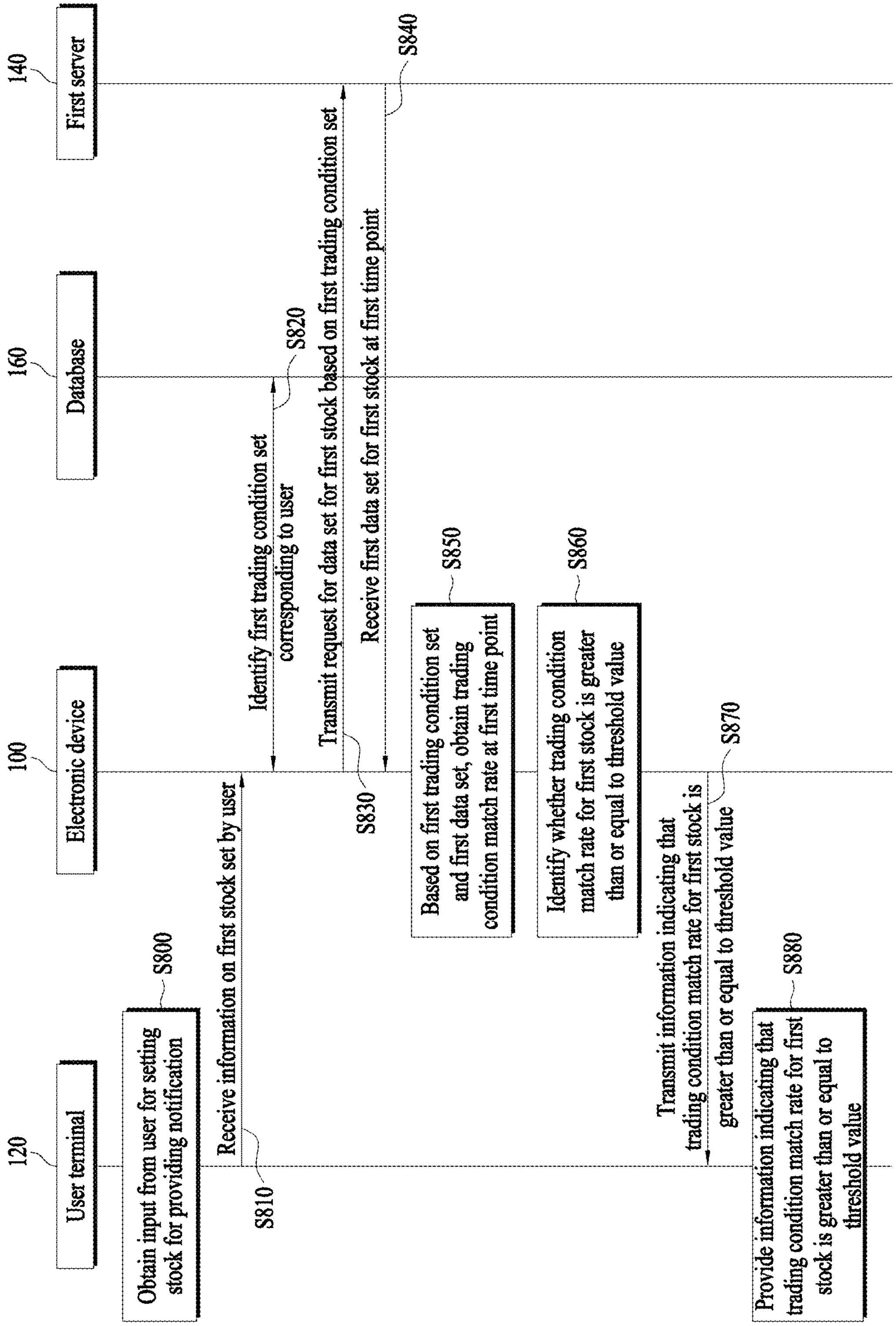
FIG. 8 is a diagram for illustrating a process of providing information on a specific stock based on information on a trading condition match rate by an electronic device according to an example embodiment.

FIG. 8 is a diagram for illustrating a process of providing information on a specific stock based on information on a trading condition match rate by the electronic device 100 according to an example embodiment. In description with reference to FIG. 8, duplicate content with the description with reference to FIG. 2 is briefly described or omitted.

In operation S800, the user terminal 120 may obtain an input from a user for setting a stock for providing a notification according to an example embodiment. For example, the user terminal 120 may obtain a user input for selecting a first stock as the stock for providing the notification among a plurality of stocks.

In operation S810, the electronic device 100 may receive information on the first stock set by the user from the user terminal 120 according to an example embodiment. For example, the user terminal 120 may transmit the information on the first stock selected by the user to the electronic device 100.

In operation S820, the electronic device 100 may identify a first trading condition set corresponding to the user, which is stored in the database 160, according to an example embodiment. For example, the electronic device 100 may retrieve one or more sets of trading conditions set by the user among a plurality of sets of trading conditions stored in the database 160 and identify the first trading condition set among the one or more sets of trading conditions.

In operation S830, the electronic device 100 may transmit a request for a data set for the first stock at a first time point to the first server 140 based on the first trading condition set according to an example embodiment. For example, when it is identified that a data set about a specific trading condition in the first trading condition set is not stored in a memory or a cache within the electronic device 100, the electronic device 100 may transmit a request for the data set about the corresponding trading condition to the first server 140.

In operation S840, the electronic device 100 may receive a first data set for the first stock at the first time point from the first server 140 according to an example embodiment. For example, the first server 140 may transmit the first data set for the first stock at the first time point to the electronic device 100 in response to receiving the request for the data set from the electronic device 100.

In operation S850, the electronic device 100 may, based on the first trading condition set and the first data set, obtain a trading condition match rate at the first time point according to an example embodiment. For example, the electronic device 100 may, based on data corresponding to each trading condition included in the first trading condition set, obtain one or more sub-condition match rates corresponding to the each trading condition. Subsequently, the electronic device 100 may obtain the trading condition match rate based on the one or more sub-condition match rates.

In operation S860, the electronic device 100 may identify whether the trading condition match rate for the first stock is greater than or equal to a threshold value according to an example embodiment. For example, the electronic device 100 may identify whether the obtained trading condition match rate is greater than or equal to the threshold value set by the user. In an example embodiment, the electronic device 100 may identify that the obtained trading condition match rate is greater than or equal to the threshold value, and in this case, the electronic device 100 may perform operation S870. In another example embodiment, the electronic device 100 may identify that the obtained trading condition match rate is less than the threshold value, and in this case, the electronic device 100 may not perform operation S870 and end operating or may re-perform operation S830 to operation S860.

Meanwhile, the electronic device 100 may perform operation S830 to operation S860 repeatedly at each set cycle.

In operation S870, the electronic device 100 may transmit information indicating that the trading condition match rate for the first stock is greater than or equal to the threshold value to the user terminal 120 according to an example embodiment. For example, when it is identified that the obtained trading condition match rate is greater than or equal to the threshold value set by the user, the electronic device 100 may transmit information indicating that the obtained trading condition match rate is greater than or equal to the threshold value set by the user to the user terminal 120.

In operation S880, the user terminal 120 may provide the information indicating that the trading condition match rate for the first stock is greater than or equal to the threshold value to the user according to an example embodiment. For example, the user terminal 120 may provide a notification that the trading condition match rate for the first stock set by the user is greater than or equal to the threshold value to the user based on information received from the electronic device 100.

As above, when a trading condition match rate for a stock set by a user is greater than or equal to a set value, the electronic device 100 may provide information indicating that the trading condition match rate for the corresponding stock is greater than or equal to a threshold value to the user, and thus, the user may buy or sell the corresponding stock in a timely manner.

Figure 9:
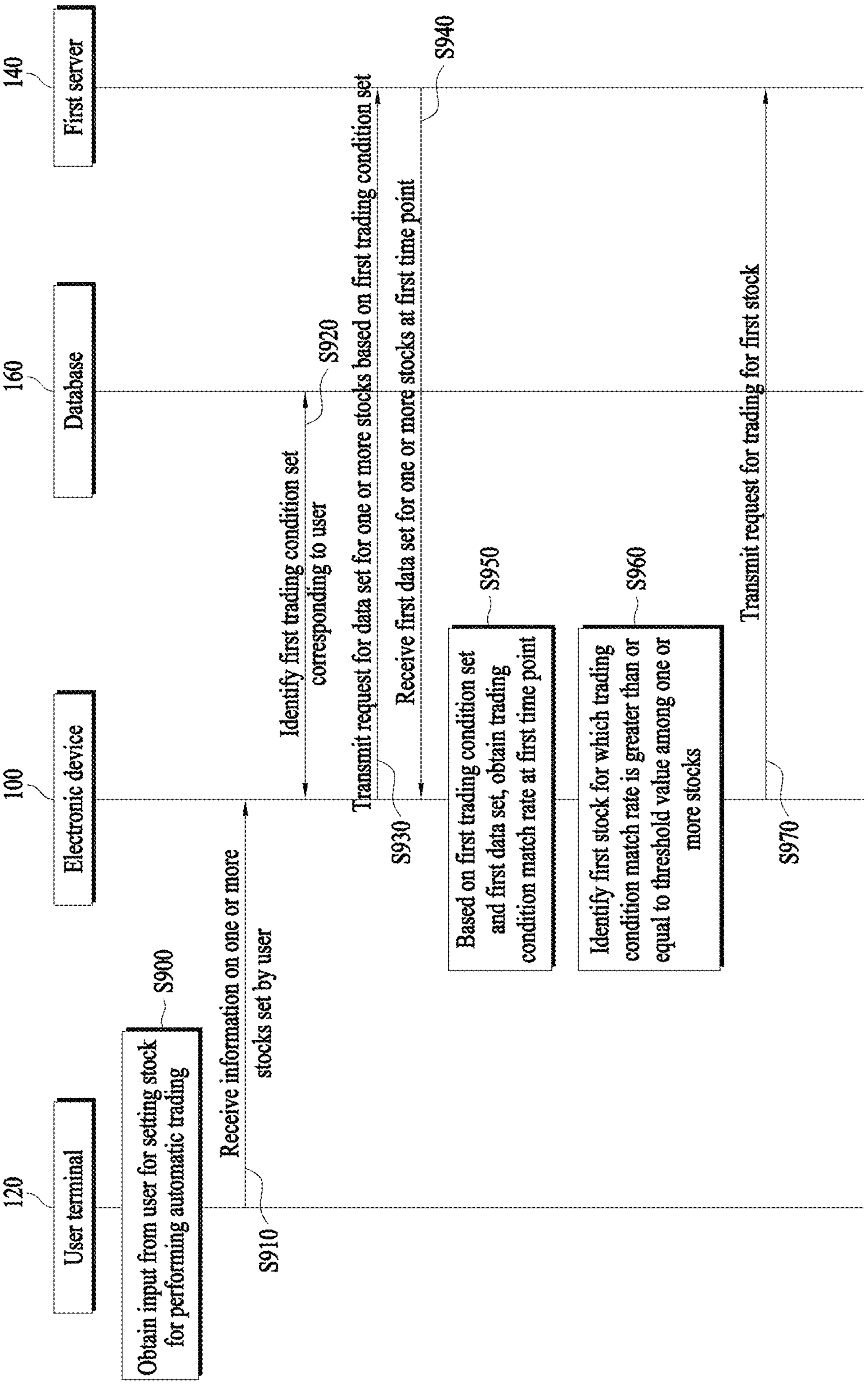
FIG. 9 is a diagram for illustrating a process of performing trading for a specific stock based on information on a trading condition match rate by an electronic device according to an example embodiment.

FIG. 9 is a diagram for illustrating a process of performing trading for a specific stock based on information on a trading condition match rate by the electronic device 100 according to an example embodiment. In description with reference to FIG. 9, duplicate content with the description with reference to FIG. 2 is briefly described or omitted.

In operation S900, the user terminal 120 may obtain an input from a user for setting a stock for performing automatic trading according to an example embodiment. For example, the user terminal 120 may obtain a user input for selecting one or more stocks as the stock for performing automatic trading among a plurality of stocks. The user terminal 120 may further obtain a user input for matters to be set by the user relating to automatic trading, such as an amount limit in performing automatic trading, a quantity limit of a stock in performing automatic trading, a time limit in performing automatic trading, and whether a user is required to confirm before executing automatic trading, in addition to the one or more stocks for performing automatic trading.

In operation S910, the electronic device 100 may receive information on the one or more stocks set by the user from the user terminal 120 according to an example embodiment. For example, the user terminal 120 may transmit the information on the one or more stocks selected by the user to the electronic device 100.

In operation S920, the electronic device 100 may identify a first trading condition set corresponding to the user, which is stored in the database 160, according to an example embodiment. For example, the electronic device 100 may retrieve one or more sets of trading conditions set by the user among a plurality of sets of trading conditions stored in the database 160 and identify the first trading condition set among the one or more sets of trading conditions.

In operation S930, the electronic device 100 may transmit a request for a data set for the one or more stocks at a first time point to the first server 140 based on the first trading condition set according to an example embodiment. For example, when it is identified that a data set about a specific trading condition in the first trading condition set is not stored in a memory or a cache within the electronic device 100, the electronic device 100 may transmit a request for the data set about the corresponding trading condition to the first server 140.

In operation S940, the electronic device 100 may receive a first data set for the one or more stocks at the first time point from the first server 140 according to an example embodiment. For example, the first server 140 may transmit the first data set for the one or more stocks at the first time point to the electronic device 100 in response to receiving the request for the data set from the electronic device 100.

In operation S950, the electronic device 100 may, based on the first trading condition set and the first data set, obtain a trading condition match rate at the first time point according to an example embodiment. For example, the electronic device 100 may, based on data corresponding to each trading condition included in the first trading condition set, obtain one or more sub-condition match rates corresponding to the each trading condition. Subsequently, the electronic device 100 may obtain the trading condition match rate based on the one or more sub-condition match rates.

In operation S960, the electronic device 100 may identify a first stock for which a trading condition match rate is greater than or equal to a threshold value among the one or more stocks according to an example embodiment. For example, the electronic device 100 may identify a first trading condition match rate greater than or equal to the threshold value set by the user among trading condition match rates for the one or more stocks and identify the first stock corresponding to the first trading condition match rate.

Meanwhile, the electronic device 100 may perform operation S930 to operation S960 repeatedly at each set cycle.

In operation S970, the electronic device 100 may transmit a request for trading for the first stock to the first server 140 according to an example embodiment. For example, the electronic device 100 may transmit a request for buying the first stock for which a corresponding buying condition match rate is greater than or equal to the threshold value to the first server 140. Alternatively, the electronic device 100 may transmit a request for selling the first stock for which a corresponding selling condition match rate is greater than or equal to the threshold value to the first server 140.

As above, when a trading condition match rate for a stock set by a user is greater than or equal to a set value, the electronic device 100 may automatically buy or sell the corresponding stock, and thus, the user may buy or sell the corresponding stock in a timely manner.

Figure 10:
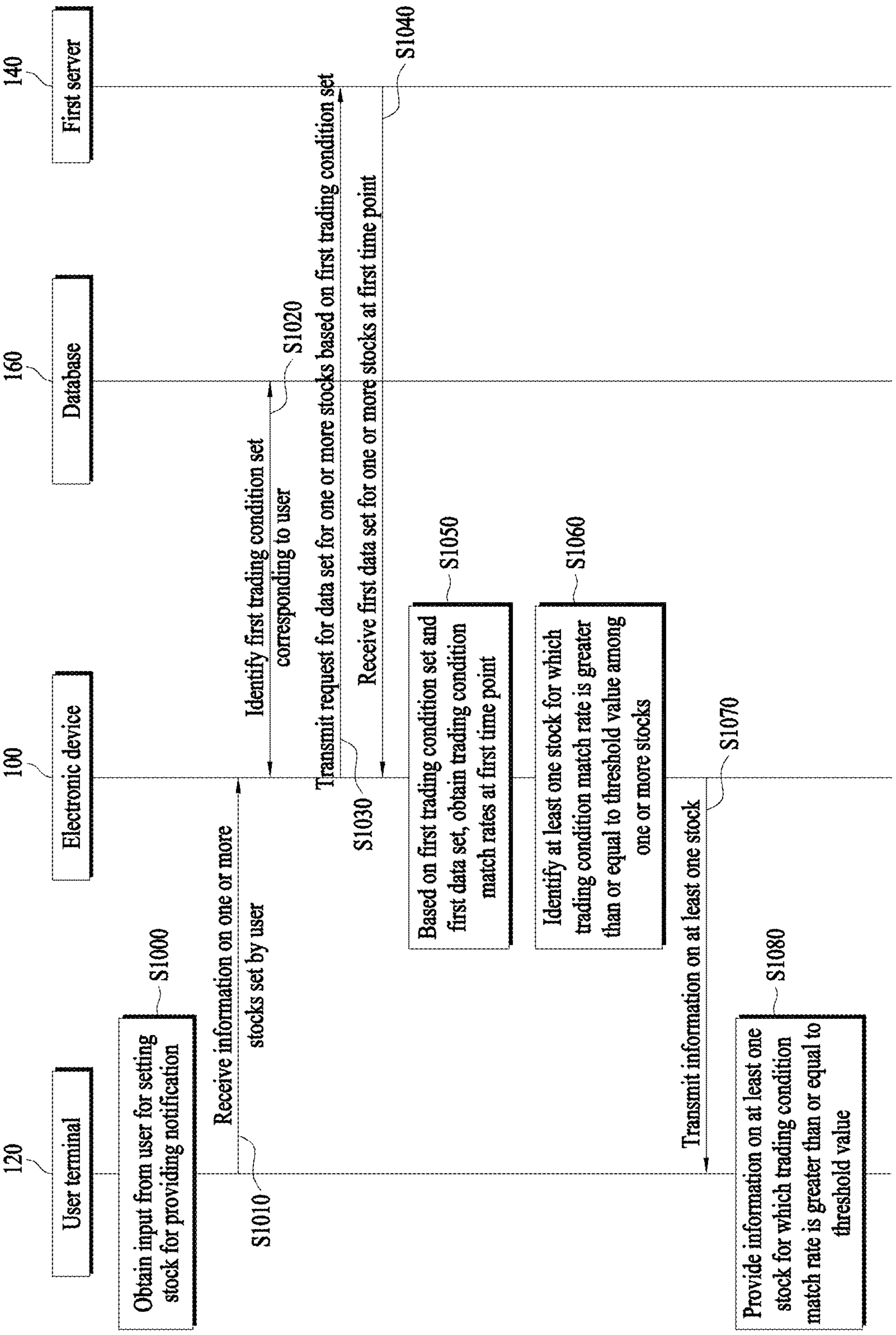
FIG. 10 is a diagram for illustrating a process of providing information on a specific stock based on information on a trading condition match rate by an electronic device according to an example embodiment.

FIG. 10 is a diagram for illustrating a process of providing information on a specific stock based on information on a trading condition match rate by the electronic device 100 according to an example embodiment. In description with reference to FIG. 10, duplicate content with the description with reference to FIG. 2 is briefly described or omitted.

In operation S1000, the user terminal 120 may obtain an input from a user for setting a stock for providing a notification according to an example embodiment. For example, the user terminal 120 may obtain a user input for selecting one or more stocks as the stock for providing the notification among a plurality of stocks.

In operation S1010, the electronic device 100 may receive information on the one or more stocks set by the user from the user terminal 120 according to an example embodiment. For example, the user terminal 120 may transmit the information on the one or more stocks selected by the user to the electronic device 100.

In operation S1020, the electronic device 100 may identify a first trading condition set corresponding to the user, which is stored in the database 160, according to an example embodiment. For example, the electronic device 100 may retrieve one or more sets of trading conditions set by the user among a plurality of sets of trading conditions stored in the database 160 and identify the first trading condition set among the one or more sets of trading conditions.

In operation S1030, the electronic device 100 may transmit a request for a data set for the one or more stocks at a first time point to the first server 140 based on the first trading condition set according to an example embodiment. For example, when it is identified that a data set about a specific trading condition in the first trading condition set is not stored in a memory or a cache within the electronic device 100, the electronic device 100 may transmit a request for the data set about the corresponding trading condition to the first server 140.

In operation S1040, the electronic device 100 may receive a first data set for the one or more stocks at the first time point from the first server 140 according to an example embodiment. For example, the first server 140 may transmit the first data set for the one or more stocks at the first time point to the electronic device 100 in response to receiving the request for the data set from the electronic device 100.

In operation S1050, the electronic device 100 may, based on the first trading condition set and the first data set, obtain trading condition match rates at the first time point according to an example embodiment. For example, the electronic device 100 may, based on data corresponding to each trading condition included in the first trading condition set, obtain one or more sub-condition match rates corresponding to the each trading condition, and based on the one or more sub-condition match rates, obtain the trading condition match rates for the one or more stocks.

In operation S1060, the electronic device 100 may identify at least one stock for which a trading condition match rate is greater than or equal to a threshold value among the one or more stocks according to an example embodiment. For example, the electronic device 100 may identify at least one trading condition match rate greater than or equal to the threshold value set by the user among the trading condition match rates for the one or more stocks and identify the at least one stock corresponding to the at least one trading condition match rate.

Meanwhile, the electronic device 100 may perform operation S1030 to operation S1060 repeatedly at each set cycle.

In operation S1070, the electronic device 100 may transmit information on the at least one stock to the user terminal 120. For example, the electronic device 100 may transmit the information on the at least one stock for which a corresponding buying condition match rate is greater than or equal to the threshold value to the user terminal 120.

In operation S1080, the user terminal 120 may provide the information on the at least one stock to the user according to an example embodiment. For example, the user terminal 120 may provide a notification that the trading condition match rate corresponding to the at least one stock among the one or more stocks set by the user is greater than or equal to the threshold value to the user based on information received from the electronic device 100.

As above, the electronic device 100 may provide information on at least one stock for which a trading condition match rate is greater than or equal to a set value among one or more stocks set by a user to the user, and thus, the user may identify a stock that meets a desired condition thereof more conveniently.

Figure 11:
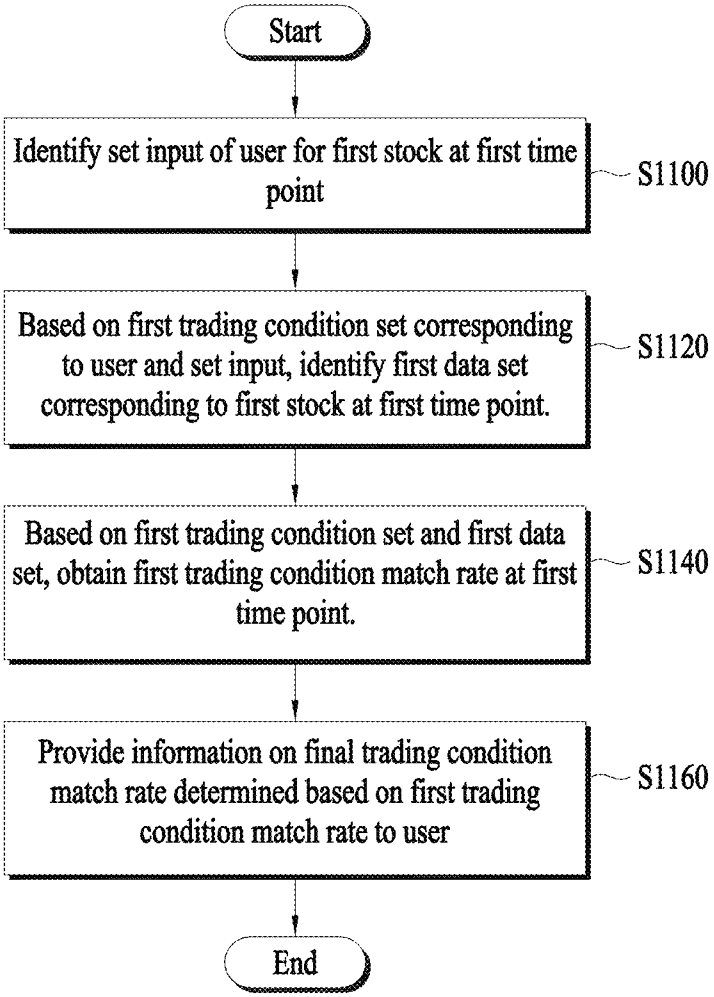
FIG. 11 shows a flowchart of a method of providing information by an electronic device according to an example embodiment.

FIG. 11 shows a flowchart of a method of providing information by an electronic device according to an example embodiment. The above descriptions may be applied to duplicated content.

In operation S1100, the electronic device may identify a set input of a user for a first stock at a first time point.

According to an example embodiment, the first time point may be understood as a time point corresponding to the selected location.

In operation S1120, the electronic device may, based on a first trading condition set corresponding to the user and the set input, identify a first data set corresponding to the first stock at the first time point.

In operation S1140, the electronic device may, based on the first trading condition set and the first data set, obtain a first trading condition match rate at the first time point.

According to an example embodiment, when obtaining the first trading condition match rate at the first time point, the electronic device may, based on data corresponding to each trading condition included in the first trading condition set in the first data set, obtain one or more sub-condition match rates corresponding to the each trading condition, and based on the one or more sub-condition match rates, obtaining the first trading condition match rate.

According to an example embodiment, a first trading condition among the first trading condition set may include a condition regarding whether a moving average line is arranged in a set arrangement order, and the first data set may include data about an arrangement order of one or more moving average lines regarding the first stock at the first time point, and a first sub-condition match rate corresponding to the first trading condition among the one or more sub-condition match rates may be determined based on a number of arrangement matches between the arrangement order of the one or more moving average lines and the set arrangement order.

According to an example embodiment, a second trading condition among the first trading condition set may include a condition regarding whether a desired trading price is located above or below a moving average line, and the first data set may include data about a first price corresponding to the set input and data about one or more moving average lines regarding the first stock at the first time point, and a second sub-condition match rate corresponding to the second trading condition among the one or more sub-condition match rates may be determined based on a number of moving average lines lower than the first price among the one or more moving average lines.

According to an example embodiment, a third trading condition among the first trading condition set may include a condition regarding a disparity rate of a moving average line, and the first data set may include data about one or more moving average values regarding the first stock at the first time point, and a third sub-condition match rate corresponding to the third trading condition among the one or more sub-condition match rates may be determined based on an average value of a variation ratio between an average value of the one or more moving average values and each of the one or more moving average values.

According to an example embodiment, a fourth trading condition among the first trading condition set may include a condition regarding whether a candle is a positive candle or a negative candle, and the first data set may include data about a first candle of the first stock at the first time point, and a fourth sub-condition match rate corresponding to the fourth trading condition among the one or more sub-condition match rates may have a set first value when the first candle is a candle of a type set as the fourth trading condition between the positive candle and the negative candle and may have a set second value when the first candle is not the candle of the type set as the fourth trading condition.

According to an example embodiment, a fifth trading condition among the first trading condition set may include a condition regarding a ratio of a current trading volume to an immediately previous trading volume, and the first data set may include data about a first trading volume of the first stock at the first time point and data about a second trading volume of the first stock at a time point earlier than the first time point by a set time unit, and a fifth sub-condition match rate corresponding to the fifth trading condition among the one or more sub-condition match rates may be determined based on a ratio between the first trading volume and the second trading volume.

According to an example embodiment, a sixth trading condition among the first trading condition set may include a condition regarding a reference value corresponding to a first technical indicator, and the first data set may include data about a third value corresponding to the first technical indicator of the first stock at the first time point, and a sixth sub-condition match rate corresponding to the sixth trading condition among the one or more sub-condition match rates may be determined based on a value obtained by dividing a difference between the third value and the reference value by the reference value, and the first technical indicator may include at least one of a relative strength index (RSI) or a stochastic index.

According to an example embodiment, when, based on the one or more sub-condition match rates, obtaining the first trading condition match rate, the electronic device may apply a weight to each of the one or more sub-condition match rates, and the weight may be determined based on at least one of a rate of return in trading based on a trading condition corresponding to each of the one or more sub-condition match rates or a number of times that the trading condition corresponding to each of the one or more sub-condition match rates is included in a trading condition set by the user.

In operation S1160, the electronic device may provide information on a final trading condition match rate determined based on the first trading condition match rate to the user.

According to an example embodiment, the electronic device may provide information about a first chart of a second stock to the user, identify a location selected by the user on the first chart, and store the first trading condition set generated based on a trading data set corresponding to the selected location.

According to an example embodiment, when providing the information about the first chart of the second stock to the user, the electronic device may identify settings information inputted by the user regarding a chart indicator, and based on the settings information, provide information about a changed first chart of the second stock to the user.

According to an example embodiment, when storing the first trading condition set, the electronic device may, based on the trading data set, provide a list of a plurality of trading conditions to the user, identify one or more trading conditions selected by the user among the plurality of trading conditions, and generate the first trading condition set including the one or more trading conditions.

According to an example embodiment, the electronic device may, for a set third stock, obtain a second trading condition match rate at a second time point, and when the second trading condition match rate is greater than or equal to a first threshold value, provide a notification to the user.

According to an example embodiment, the electronic device may, for a set fourth stock, obtain a third trading condition match rate at a third time point, and when the third trading condition match rate is greater than or equal to a second threshold value, transmit a trading request for the fourth stock to a first server.

According to an example embodiment, the electronic device may, for a plurality of set stocks, obtain a plurality of trading condition match rates at a fourth time point, identify one or more trading condition match rates greater than or equal to a third threshold value among the plurality of trading condition match rates, and provide information on one or more stocks corresponding to the one or more trading condition match rates to the user.

According to an example embodiment, the electronic device may, based on a second trading condition set, identify a second data set corresponding to the set input, and based on the second trading condition set and the second data set, obtain a fourth trading condition match rate at the first time point. In this case, the final trading condition match rate may be determined further based on the fourth trading condition match rate.

According to an example embodiment, the final trading condition match rate may be determined as an average value of the first trading condition match rate and the fourth trading condition match rate or a highest value of the first trading condition match rate and the fourth trading condition match rate.

Figure 12:
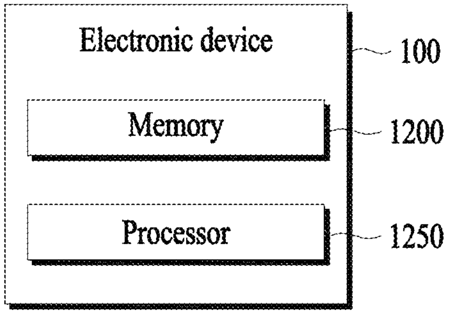
FIG. 12 shows a block diagram of an electronic device according to an example embodiment.

FIG. 12 shows a block diagram of the electronic device 100 according to an example embodiment.

According to an example embodiment, the electronic device 100 may include a memory 1200 and one or more processors 1250. In the electronic device 100 illustrated in FIG. 12, elements related to the example embodiments are illustrated. Therefore, it may be understood by those of ordinary skill in the art to which the example embodiments pertain that other general-purpose elements may be further included in addition to the elements illustrated in FIG. 12.

For example, the electronic device 100 may include a communication device (not shown) according to an example embodiment. The communication device may be a device for performing wired and wireless communications and may communicate with an external electronic device. The external electronic device may be a terminal or a server. In addition, a communication technology used by the communication device may include a global system for mobile communication (GSM), code division multi-access (CDMA), long term evolution (LTE), 5G, wireless local area network (WLAN), wireless-fidelity (Wi-Fi), Bluetooth, radio frequency identification (RFID), infrared data association (IrDA), ZigBee, near field communication (NFC), or the like.

The one or more processors 1250 may control the overall operation of the electronic device 100 and process data and signals. The one or more processors 1250 may consist of at least one hardware unit. In addition, the one or more processors 1250 may operate by one or more software modules generated by executing one or more instructions stored in the memory 1200.

The one or more processors 1250 may identify a set input of a user for a first stock at a first time point, based on a first trading condition set corresponding to the user and the set input, identify a first data set corresponding to the first stock at the first time point, based on the first trading condition set and the first data set, obtain a first trading condition match rate at the first time point, and provide information on a final trading condition match rate determined based on the first trading condition match rate to the user.

The electronic device according to the above-described example embodiments may include a processor, a memory for storing and executing program data, a permanent storage such as a disk drive, a communication port that communicates with an external device, and a user interface device such as a touch panel, a key, and a button. Methods implemented by software modules or algorithms may be stored in a computer-readable recording medium as computer-readable codes or program instructions executable on the processor. Here, the computer-readable recording medium includes a magnetic storage medium (for example, read-only memory (ROM), random-access memory (RAM), floppy disks, and hard disks) and an optically readable medium (for example, CD-ROM and digital versatile discs (DVDs)). The computer-readable recording medium may be distributed among network-connected computer systems, so that the computer-readable codes may be stored and executed in a distributed manner. The medium may be readable by a computer, stored in a memory, and executed on a processor.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic, and/or look-up table, which may execute various functions by the control of one or more microprocessors or other control devices. Similarly to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means," and "configuration" may be used broadly and are not limited to mechanical and physical configurations. The terms may include the meaning of a series of routines of software in association with a processor or the like.

The above-described example embodiments are merely examples, and other example embodiments may be implemented within the scope of the claims to be described later.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of providing information by an electronic device, the method comprising:

providing, to a terminal of a user, a first user interface (UI) including a chart for a first stock, the chart displayed on the terminal;

receiving, from the terminal of the user, a user input specifying a first time point on the chart and selecting a UI component associated with the first time point, wherein the UI component includes at least one of a UI component for requesting a purchase, a UI component for requesting a sale, or a UI component for requesting identification of a trading condition match rate;

identifying, from data associated with the first stock at the first time point, trading data corresponding to one or more trading conditions included in a first trading condition set corresponding to the user, wherein the trading data comprises at least one visual indicator on the chart at the first time point;

obtaining a first data set based on the identified trading data;

based on the first trading condition set and the first data set, obtaining a first trading condition match rate at the first time point; and transmitting, to the terminal, information for triggering a dynamic update of the first UI to display a final trading condition match rate determined based on the first trading condition match rate, wherein the information causes a UI displaying the final trading condition match rate to be presented as an overlay synchronized with the first time point on the chart.

2. The method of claim 1, wherein the obtaining of the first trading condition match rate at the first time point comprises:

based on the identified trading data, obtaining one or more sub-condition match rates corresponding to the one or more trading conditions; and based on the one or more sub-condition match rates, obtaining the first trading condition match rate.

3. The method of claim 2, wherein a first trading condition among the first trading condition set includes a condition regarding whether a moving average line is arranged in a set arrangement order, wherein the first data set includes data about an arrangement order of one or more moving average lines regarding the first stock at the first time point, and wherein a first sub-condition match rate corresponding to the first trading condition among the one or more sub-condition match rates is determined based on a number of arrangements match between the arrangement order of the one or more moving average lines and the set arrangement order.

4. The method of claim 2, wherein a second trading condition among the first trading condition set includes a condition regarding whether a desired trading price is located above or below a moving average line, wherein the first data set includes data about a first price corresponding to the user input and data about one or more moving average lines regarding the first stock at the first time point, and wherein a second sub-condition match rate corresponding to the second trading condition among the one or more sub-condition match rates is determined based on a number of moving average lines lower than the first price among the one or more moving average lines.

5. The method of claim 2, wherein a third trading condition among the first trading condition set includes a condition regarding a disparity rate of a moving average line, wherein the first data set includes data about one or more moving average values regarding the first stock at the first time point, and wherein a third sub-condition match rate corresponding to the third trading condition among the one or more sub-condition match rates is determined based on an average value of a variation ratio between an average value of the one or more moving average values and each of the one or more moving average values.

6. The method of claim 2, wherein a fourth trading condition among the first trading condition set includes a condition regarding whether a candle is a positive candle or a negative candle, wherein the first data set includes data about a first candle of the first stock at the first time point, and wherein a fourth sub-condition match rate corresponding to the fourth trading condition among the one or more sub-condition match rates has a set first value when the first candle is a candle of a type set as the fourth trading condition between the positive candle and the negative candle and has a set second value when the first candle is not the candle of the type set as the fourth trading condition.

7. The method of claim 2, wherein a fifth trading condition among the first trading condition set includes a condition regarding a ratio of a current trading volume to an immediately previous trading volume, wherein the first data set includes data about a first trading volume of the first stock at the first time point and data about a second trading volume of the first stock at a time point earlier than the first time point by a set time unit, and wherein a fifth sub-condition match rate corresponding to the fifth trading condition among the one or more sub-condition match rates is determined based on a ratio between the first trading volume and the second trading volume.

8. The method of claim 2, wherein a sixth trading condition among the first trading condition set includes a condition regarding a reference value corresponding to a first technical indicator, wherein the first data set includes data about a third value corresponding to the first technical indicator of the first stock at the first time point, wherein a sixth sub-condition match rate corresponding to the sixth trading condition among the one or more sub-condition match rates is determined based on a value obtained by dividing a difference between the third value and the reference value by the reference value, and wherein the first technical indicator includes at least one of a relative strength index or a stochastic index.

9. The method of claim 2, wherein, based on the one or more sub-condition match rates, the obtaining of the first trading condition match rate comprises applying a weight to each of the one or more sub-condition match rates, and wherein the weight is determined based on at least one of:

a rate of return in trading based on a trading condition corresponding to each of the one or more sub-condition match rates; or a number of times that the trading condition corresponding to each of the one or more sub-condition match rates is included in a trading condition set by the user.

10. The method of claim 1, further comprising:

providing information about a first chart of a second stock to the terminal;

identifying a location selected by the user on the first chart; and storing the first trading condition set generated based on a trading data set corresponding to the selected location.

11. The method of claim 10, wherein the providing of the information about the first chart of the second stock to the terminal comprises:

identifying settings information inputted by the user regarding a chart indicator; and based on the settings information, providing information about a changed first chart of the second stock to the terminal.

12. The method of claim 10, wherein the storing of the first trading condition set comprises:

based on the trading data set, providing a list of a plurality of trading conditions to the terminal;

identifying one or more trading conditions selected by the user among the plurality of trading conditions; and generating the first trading condition set including the one or more trading conditions.

13. The method of claim 1, further comprising:

for a set third stock, obtaining a second trading condition match rate at a second time point; and when the second trading condition match rate is greater than or equal to a first threshold value, providing a notification to the terminal.

14. The method of claim 1, further comprising:

for a set fourth stock, obtaining a third trading condition match rate at a third time point; and when the third trading condition match rate is greater than or equal to a second threshold value, transmitting a trading request for the fourth stock to a first server.

15. The method of claim 1, further comprising:

for a plurality of set stocks, obtaining a plurality of trading condition match rates at a fourth time point;

identifying one or more trading condition match rates greater than or equal to a third threshold value among the plurality of trading condition match rates; and providing information on one or more stocks corresponding to the one or more trading condition match rates to the terminal.

16. The method of claim 1, further comprising:

based on a second trading condition set, identifying a second data set corresponding to the user input; and based on the second trading condition set and the second data set, obtaining a fourth trading condition match rate at the first time point, wherein the final trading condition match rate is determined further based on the fourth trading condition match rate.

17. The method of claim 16, wherein the final trading condition match rate is determined as an average value of the first trading condition match rate and the fourth trading condition match rate or a highest value of the first trading condition match rate and the fourth trading condition match rate.

18. A non-transitory computer-readable recording medium having a program for executing a method on a computer, the method comprising:

providing, to a terminal of a user, a first user interface (UI) including a chart for a first stock, the chart displayed on the terminal;

receiving, from the terminal of the user, a user input specifying a first time point on the chart and selecting a UI component associated with the first time point, wherein the UI component includes at least one of a UI component for requesting a purchase, a UI component for requesting a sale, or a UI component for requesting identification of a trading condition match rate;

identifying, from data associated with the first stock at the first time point, trading data corresponding to one or more trading conditions included in a first trading condition set corresponding to the user, wherein the trading data comprises at least one visual indicator on the chart at the first time point;

obtaining a first data set based on the identified trading data;

based on the first trading condition set and the first data set, obtaining a first trading condition match rate at the first time point; and transmitting, to the terminal, information for triggering a dynamic update of the first UI to display a final trading condition match rate determined based on the first trading condition match rate, wherein the information causes a UI displaying the final trading condition match rate to be presented as an overlay synchronized with the first time point on the chart.

19. An electronic device comprising:

one or more processors; and a memory configured to store one or more instructions executed by the one or more processors, wherein the one or more processors are configured, by executing the one or more instructions, to:

provide, from the terminal of the user, a user input specifying a first time point on the chart and selecting a UI component associated with the first time point, wherein the UI component includes at least one of a UI component for requesting a purchase, a UI component for requesting a sale, or a UI component for requesting identification of a trading condition match rate;

identify, from data associated with the first stock at the first time point, trading data corresponding to one or more trading conditions included in a first trading condition set corresponding to the user, wherein the trading data comprises at least one visual indicator on the chart at the first time point;

obtain a first data set based on the identified trading data;

based on the first trading condition set and the first data set, obtain a first trading condition match rate at the first time point; and transmit, to the terminal, information for triggering a dynamic update of the first UI to display a final trading condition match rate determined based on the first trading condition match rate, wherein the information causes a UI displaying the final trading condition match rate to be presented as an overlay synchronized with the first time point on the chart.

20. The electronic device of claim 19, wherein the obtaining of the first trading condition match rate at the first time point comprises:

based on the identified trading data, obtaining one or more sub-condition match rates corresponding to the one or more trading conditions; and based on the one or more sub-condition match rates, obtaining the first trading condition match rate.

* * * * *